United States Patent
Nasu et al.

(10) Patent No.: US 10,654,483 B2
(45) Date of Patent: May 19, 2020

(54) DRIVE FORCE CONTROL SYSTEM

(71) Applicant: TOYOTA JIDOSHA KABUSHIKI KAISHA, Toyota-shi, Aichi (JP)

(72) Inventors: Takanobu Nasu, Sagamihara (JP); Hiroshi Isono, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 205 days.

(21) Appl. No.: 15/901,123

(22) Filed: Feb. 21, 2018

(65) Prior Publication Data
US 2018/0237014 A1 Aug. 23, 2018

(30) Foreign Application Priority Data
Feb. 21, 2017 (JP) ................. 2017-030462

(51) Int. Cl.
*B60W 30/188* (2012.01)
*B60K 7/00* (2006.01)
(Continued)

(52) U.S. Cl.
CPC ............ *B60W 30/188* (2013.01); *B60K 1/02* (2013.01); *B60K 7/0007* (2013.01); *B60K 17/02* (2013.01);
(Continued)

(58) Field of Classification Search
CPC ..... Y02T 10/645; Y02T 10/646; Y02T 10/72; Y02T 10/7275; F16D 27/14; F16D 2027/002; F16D 2121/14; F16D 2121/20; F16D 2500/1045; F16D 2500/1064; F16D 2500/508; F16D 2500/70408; F16D 48/06; B60W 2510/085; B60W 2510/02; B60W 2510/08; B60W 30/188; B60L 2210/40;
(Continued)

(56) References Cited

U.S. PATENT DOCUMENTS 7,609,011 B2 * 10/2009 Yatabe ................ B60K 6/445
318/140
9,522,612 B2 * 12/2016 Spelta ................ B60W 50/085
(Continued)

FOREIGN PATENT DOCUMENTS

EP 2484571 A1 8/2012
EP 2769874 A2 8/2014
(Continued)

Primary Examiner — Anthony R Jimenez
(74) Attorney, Agent, or Firm — Oliff PLC

(57) ABSTRACT

A drive force control system appropriately controls motors each connected to a corresponding one of drive wheels, so that a vehicle can be propelled with high efficiency. First motor and second motors are controlled in such a manner that a sum of torques transmitted to a right front wheel and a left rear wheel equals to a total value of required torques of the right front wheel and the left rear wheel. A target torque of the first motor and a target torque of the second motor achieving a smallest amount of power output from an electrical power source, for the output torques from the first motor and the second motor are calculated. A torque is generated by the first motor based on the target torque of the first motor calculated, and a torque is generated by the second motor based on the target torque of the second motor calculated.

12 Claims, 20 Drawing Sheets

(51) Int. Cl.

| | |
|---|---|
| *B60K 17/08* | (2006.01) |
| *B60K 1/02* | (2006.01) |
| *B60L 15/20* | (2006.01) |
| *B60K 17/02* | (2006.01) |
| *B60K 17/16* | (2006.01) |
| *B60K 17/356* | (2006.01) |
| *B60W 10/02* | (2006.01) |
| *B60W 10/08* | (2006.01) |
| *B62D 11/00* | (2006.01) |
| *B62D 11/04* | (2006.01) |
| *F16D 48/06* | (2006.01) |
| *B60K 23/04* | (2006.01) |
| *B60L 50/51* | (2019.01) |
| *F16D 27/14* | (2006.01) |
| *F16D 27/00* | (2006.01) |
| *F16D 121/14* | (2012.01) |
| *F16D 121/20* | (2012.01) |

(52) U.S. Cl.
CPC .............. *B60K 17/08* (2013.01); *B60K 17/16* (2013.01); *B60K 17/165* (2013.01); *B60K 17/356* (2013.01); *B60L 15/2054* (2013.01); *B60W 10/02* (2013.01); *B60W 10/08* (2013.01); *B62D 11/003* (2013.01); *B62D 11/04* (2013.01); *F16D 48/06* (2013.01); *B60K 2007/0061* (2013.01); *B60K 2023/043* (2013.01); *B60K 2023/046* (2013.01); *B60L 50/51* (2019.02); *B60L 2210/40* (2013.01); *B60L 2220/44* (2013.01); *B60L 2220/46* (2013.01); *B60L 2240/00* (2013.01); *B60W 2510/085* (2013.01); *B60W 2710/027* (2013.01); *B60W 2710/083* (2013.01); *F16D 27/14* (2013.01); *F16D 2027/002* (2013.01); *F16D 2121/14* (2013.01); *F16D 2121/20* (2013.01); *F16D 2500/1045* (2013.01); *F16D 2500/1064* (2013.01); *F16D 2500/508* (2013.01); *F16D 2500/70408* (2013.01); *Y02T 10/645* (2013.01); *Y02T 10/646* (2013.01); *Y02T 10/72* (2013.01); *Y02T 10/7275* (2013.01)

(58) Field of Classification Search
CPC .. B60L 220/44; B60L 220/46; B60L 2240/00; B60L 50/51; B60L 15/2054; B60K 2007/0061; B60K 2023/043; B60K 2023/046; B60K 1/02; B60K 7/0007; B60K 17/02; B60K 17/08; B60K 17/16; B60K 17/165; B60K 17/356; B62D 11/003; B62D 11/04
USPC .......................................................... 701/22
See application file for complete search history.

(56) References Cited

U.S. PATENT DOCUMENTS

| | | |
|---|---|---|
| 2016/0039405 A1 | 2/2016 | Terayama et al. |
| 2016/0068159 A1 | 3/2016 | Zou |
| 2017/0008422 A1 | 1/2017 | Honda |
| 2017/0028872 A1 | 2/2017 | Fukudome |

FOREIGN PATENT DOCUMENTS

| | | |
|---|---|---|
| JP | 2011-188557 A | 9/2011 |
| JP | 2016-059269 A | 4/2016 |
| WO | 2014/122562 A1 | 8/2014 |

* cited by examiner

DRIVE FORCE CONTROL SYSTEM

CROSS REFERENCE TO RELATED APPLICATION

The present invention claims the benefit of Japanese Patent Application No. 2017-030462 filed on Feb. 21, 2017 with the Japanese Patent Office, the disclosures of which are incorporated herein by reference in its entirety.

BACKGROUND

Field of the Invention

Embodiments of the present application relate to the art of a control system for controlling drive force of a vehicle in which a motor is individually connected to each drive wheel.

Discussion of the Related Art

JP-A-2011-188557 and US 2016/068159 A1 describe examples of a drive force control system in which a motor is individually connected to each drive wheel. According to the teachings of JP-A-2011-188557, the motors connected to a pair of front wheels are operated as motors, and the motors connected to a pair of rear wheels are operated as generators. The motors are controlled in such a manner that a sum of a drive force established by the front wheels and a drive force (brake) established by rear wheels becomes equal to a drive force required by a vehicle.

In the vehicle taught by US 2016/068159 A1, a motor is individually connected to each of a left drive wheel and a right drive wheel, and a friction clutch is provided to enable a torque to be transmitted between these motors. The friction clutch has a torque transmitting capacity controlled depending on a road condition. According to the teachings of US 2016/068159 A1, a drive force control system determines whether to propel the vehicle with the drive force generated by one of the motors or to propel the vehicle with the drive force generated by the two motors depending on a road condition and a vehicle speed, and further determines whether each of the motors operates as a motor or a generator. Specifically, the vehicle is propelled by the output power of a single motor to travel at a low vehicle speed under a suburban road condition, and is propelled by the output powers of the two motors to travel at a mid to high vehicle speed under the suburban road condition.

As described, according to the teachings of JP-A-2011-188557, one of the pairs of front and rear wheels establish the drive force, and the other pair of wheels establish the brake force. This results in a large slip amount between a road surface and one of the front wheels and the rear wheels, and the drive wheels may become worn. Such a large slip amount also results in a large power loss between the drive wheels and the road surface. As a result, acceleration of the vehicle with respect to a motor output may be reduced, even when the motor is operating at an optimum operating point. Thus, a power loss of the vehicle as a whole may be increased.

A motor serving as a prime mover of the vehicle can be more efficiently operated for generating a larger torque as long as the torque is smaller than a predetermined torque. In this context, the vehicle travelling at a low vehicle speed may be propelled by the output power of a single motor, as in the drive force control system for a vehicle described in US 2016/068159 A1, so that the motor can generate a large torque. As a result, the motor can operate at an optimum operating point, as compared with a case of propelling the vehicle by the output powers of two motors. However, the motor is less efficiently operated for generating a larger torque not smaller than the predetermined torque. Thus, the vehicle requires a large drive force, the efficiency may be lower in the case of propelling the vehicle by the output power of a single motor than in the case of propelling the vehicle by the output powers of two motors. Further, even when the torque to be generated is smaller than the predetermined torque, the vehicle may be propelled in a more efficient manner with the two motors operated with one motor operating as a motor and the other motor operating as a generator. Thus, the vehicle may not be propelled in an efficient manner with the motor to be operated inflexibly depending on the road condition and the torque transmitting capacity of the clutch inflexibly determined as taught by US 2016/068159 A1.

SUMMARY

Aspects of embodiments of the present application have been conceived noting the foregoing technical problems, and it is therefore an object of embodiments of the present disclosure is to provide a drive force control system configured to improve operating efficiency of a vehicle by controlling motors connected to drive wheels and a clutch in an efficient manner.

The drive force control system is applied to a vehicle comprising: a first motor connected to a right drive wheel; a second motor connected to a left drive wheel; an electrical power source that supplies electric power to the first motor and the second motor; and a clutch that allows a torque transmission between the first motor and the second motor, in which a torque transmitting capacity is variable. In order to achieve the above-explained objective, according to the embodiment of the present disclosure, the drive force control system is provided with a controller that controls output torques from the first motor and the second motor. Specifically, the controller is configured to: control the output torques of the first motor and the second motor in such a manner as to equalize a sum of torques transmitted to the right drive wheel and the left drive wheel to propel the vehicle while setting the torque transmitting capacity of the clutch greater than a predetermined value, to a total value of required torques of the right drive wheel and the left drive wheel; calculate a target output torque of the first motor and a target output torque of the second motor to minimize an output power from the electrical power source; and generate a torque by the first motor based on the calculated target output torque of the first motor, and generate a torque by the second motor (2L) based on the calculated target torque of the second motor.

In a non-limiting embodiment, the controller may be further configured to: calculate a first reference torque of a first controlled motor as any one of the first motor and the second motor in such a manner as to maximize an efficiency of the first controlled motor when the first controlled motor is rotated at a speed based on a wheel speed of a first drive wheel as one of the right drive wheel and the left drive wheel connected to the first controlled motor; calculate a second reference torque of a second controlled motor as the other one of the first motor and the second motor based on a difference between the first reference torque and the total value, calculate the target output torque of the first controlled motor based on the first reference torque; and calculate the target output torque of the second controlled motor based on the second reference torque.

In a non-limiting embodiment, the controller may be further configured to: calculate a plurality of first provisional torques by changing the first reference torque by a predetermined toque, and calculate a plurality of second provisional torques of the second controlled motor in such a manner that the sum is equalized to the total value; calculate a power consumption amount of the electrical power source to generate the first provisional torque by the first controlled motor and to generate the second provisional torque by the second controlled motor, each time the first reference torque is changed by the predetermined toque; set a target output torque of the first controlled motor to the first provisional torque that has been calculated immediately previously, when the power consumption amount of the electrical power source currently calculated is greater than the power consumption amount of the electrical power source immediately previously calculated; and set a target output torque of the second controlled motor to the second provisional torque that has been calculated immediately previously, when the power consumption amount of the electrical power source currently calculated is greater than the power consumption amount of the electrical power source immediately previously calculated.

In a non-limiting embodiment, the controller may be further configured to: calculate an efficient torque of the first motor achieving a maximum efficiency of the first motor when the first motor is rotated at a speed based on the wheel speed of the right drive wheel; calculate an efficient torque of the second motor achieving a maximum efficiency of the second motor when the second motor is rotated at the speed based on the wheel speed of the left drive wheel; and designate one of the first motor and the second motor in which the efficient torque is greater as the first controlled motor.

In a non-limiting embodiment, e controller may be further configured to: calculate a first power consumption amount of the electrical power source to generate a torque by the first motor in such a manner as to maximize the efficiency of the first motor, and to generate a torque by the second motor in such a manner that the sum torque is equalized to the required torque; calculate a second power consumption amount of the electrical power source to generate a torque the second motor in such a manner as to maximize the efficiency of the second motor, and to generate a torque by the first motor in such a manner that the sum torque is equalized to the required torque; designate the first motor as the first controlled motor when the first power consumption amount is smaller than the second power consumption amount; and designate the second motor as the first controlled motor when the first power consumption amount is larger than the second power consumption amount.

In a non-limiting embodiment, the controller may be further configured to: calculate a third reference torque as a maximum torque of a third controlled motor that is one of the first motor and the second motor; calculate a fourth reference torque of a fourth controlled motor that is the other one of the first motor and the second motor based on a difference between the third reference torque and the required torque; calculate a target torque of the third controlled motor based on the third reference torque; and calculate a target torque of the fourth controlled motor based on the fourth reference torque.

In a non-limiting embodiment, the controller may be further configured to: calculate a plurality of third provisional torques by changing the third reference torque by a predetermined torque, and calculate a plurality of fourth provisional torques of the fourth controlled motor in such a manner that the sum is equalized to the total value, calculate the power consumption amount of the electrical power source to generate the third provisional torque by the third controlled motor and to generate the fourth provisional torque by s the fourth controlled motor, each time the third reference torque is changed by the predetermined torque, set a target torque of the third controlled motor to the third provisional torque immediately previously calculated, when the power consumption amount of the electrical power source currently calculated is greater than the power consumption amount of the electrical power source immediately previously calculated, and set a target torque of the fourth controlled motor to the fourth provisional torque immediately previously calculated, when the power consumption amount of the electrical power source currently calculated is greater than the power consumption amount of the electrical power source immediately previously calculated.

In a non-limiting embodiment, the controller may be further configured to: control the torque transmitting capacity of the clutch; calculate the torque transmitting capacity of the clutch based on a difference between a torque transmitted to a second drive wheel as one of the left drive wheel and the right drive wheel connected to the third controlled motor and the required torque of the second drive wheel, when the third controlled motor generates the third reference torque; and calculate the fourth reference torque based on a torque transmitted to a third drive wheel as the other one of the right drive wheel and the left drive wheel via the clutch and the required torque of the third drive wheel, when the third controlled motor generates the third reference torque.

In a non-limiting embodiment, the controller may be further configured to: control the torque transmitting capacity of the clutch; calculate the torque transmitting capacity of the clutch based on a difference between a torque transmitted to a fourth drive wheel as one of the left drive wheel and the right drive wheel connected to the third controlled motor and the required torque of the fourth drive wheel, when the third controlled motor generates the third provisional torque; and calculate the fourth provisional torque based on a torque transmitted to a fifth drive wheel as the other one of the right drive wheel and the left drive wheel via the clutch and the required torque of the fifth drive wheel, when the third controlled motor generates the third provisional torque.

In a non-limiting embodiment, the controller may be further configured to designate one of the first motor and the second motor connected to one of the drive wheels to which a larger torque is required as the third controlled motor.

In a non-limiting embodiment, the controller may be further configured to set the target torque of the first motor and the target torque of the second motor in such a manner that the first motor and the second motor generate torques in opposite directions, when the torques are transmitted to the left drive wheel and the right drive wheel in the same direction.

Thus, according to the present invention, a first motor connected to a drive wheel on a right side and a second motor connected to a drive wheel on a left side enable a torque to be transmitted via the clutch. The motors are controlled in such a manner that the sum of torques transmitted to right and left drive wheel becomes equal to the total value of torques required for the drive wheels. Target torques of the motors are set to achieve smallest power output from an electrical power source. Thus, the torque, generated by each of the first motor and the second motor, is adjusted to be the torque required for the drive wheel in a torque transmission path to the drive wheel. This ensures that power loss between the drive wheels and a road surface is less likely to occur due to the slipping of one of the drive wheels receiving an excessive amount of torque. The target torque of each motor is set by using the power consumption amount output from the electrical power source as a parameter, whereby the efficiency of the drive unit as a whole can be improved.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
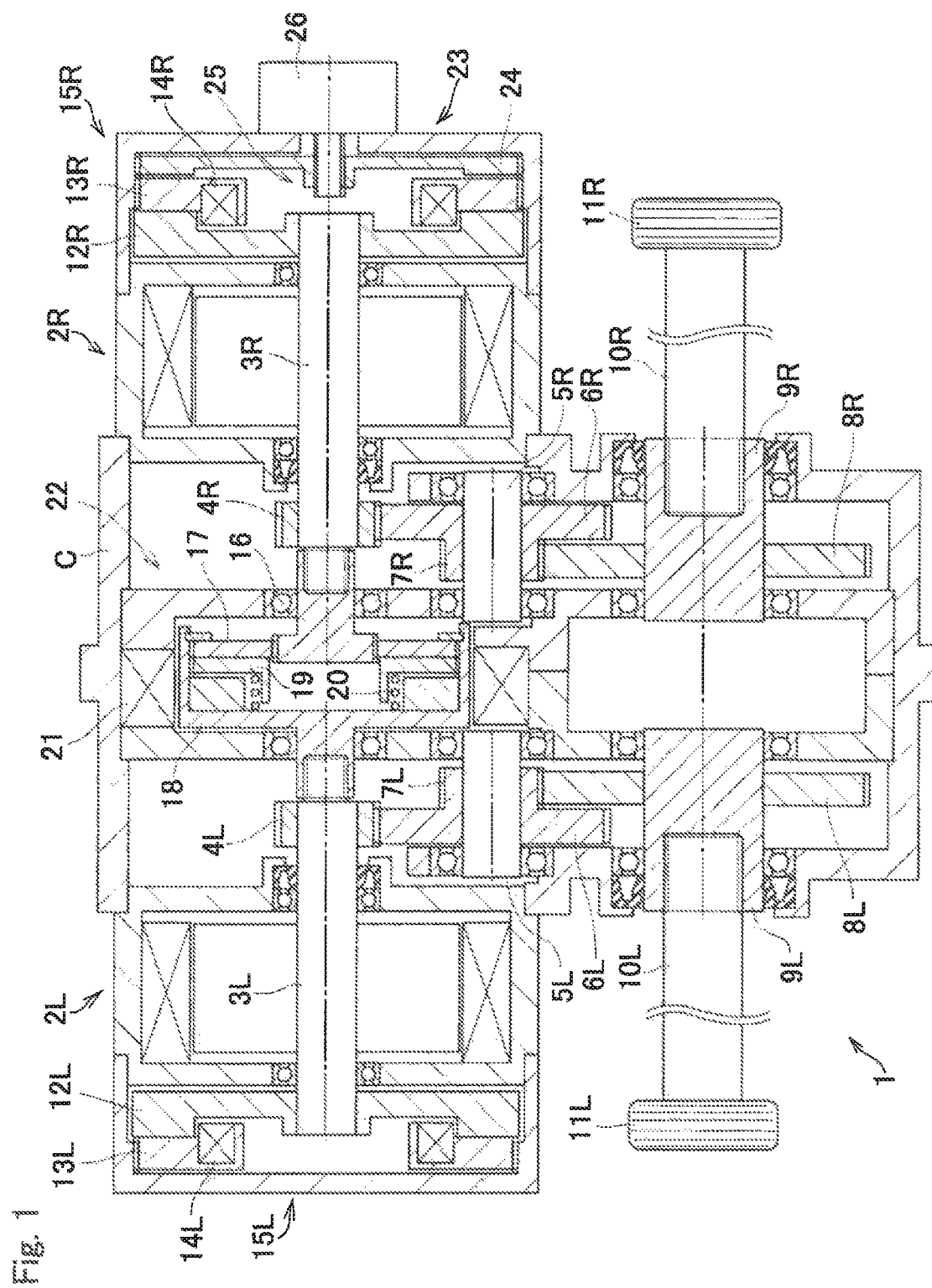
FIG. 1 is a cross-sectional view showing one example of a first drive unit having motors individually connected to each front wheel and a clutch that enables torque transmission between the motors.

A vehicle according to the embodiment of the present disclosure includes drive motors (to be simply referred to as motors hereinafter) and a clutch. The motors are connected to at least one of pairs of front wheels and rear wheels, and the clutch that selectively allows torque transmission between the motors. Turning now to FIG. 1, there is shown one example of a drive unit including the motor and the clutch according to the present disclosure. As can be seen from FIG. 1, a structure of the drive unit 1 is substantially symmetrical across a width center of the vehicle. In the following explanation, only a configuration on the right half in the figure will be explained, and an explanation for the left half will be omitted except for a configuration different from that of the right half. In FIG. 1, accordingly, the reference letter "R" designates members arranged in the right half of the drive unit 1, and the reference letters "L" designates members arranged in the left half of the drive unit 1. In the flowing explanation, the members in the right half of the drive unit 1 will be called the "first member", and the members in the left half of the drive unit 1 will be called the "second member" as necessary.

The drive unit 1 includes a motor 2 serving as a prime mover of a vehicle. For example, a motor-generator such as a permanent magnet synchronous motor may be used as the drive motor, as in the case of conventionally known motors serving as prime movers of hybrid vehicles and electric vehicles.

An output gear 4 is fitted onto a laterally inner end of an output shaft 3 of the motor 2 extending widthwise, and a countershaft 5 extends parallel to the output shaft 3. A counter driven gear 6 that is diametrically larger than the output gear 4 is fitted onto a laterally outer portion of the countershaft 5, and a pinion gear 7 that is diametrically smaller than the counter driven gear 6 is also fitted onto a laterally inner portion of the countershaft 5 to be meshed with a final reduction gear 8 that is diametrically larger than the pinion gear 7.

A cylindrical shaft 9 is inserted into the final reduction gear 8 about the rotational center thereof in such a manner as to protrude laterally outwardly while opening to laterally outside. A laterally inner end of a driveshaft 10 is splined into the opening of the cylindrical shaft 9, and a drive wheel 11 is attached to a laterally outer end of the driveshaft 10.

A disc-shaped brake rotor 12 made of magnetic material is fitted onto a laterally outer end of the output shaft 3. An annular brake stator 13 faces the brake rotor 12. The brake stator 13 is splined into a casing C so that the brake stator 13 is allowed to move toward the brake rotor 12 but not allowed to rotate. The brake stator 13 is provided with a coil 14 so that the brake stator 13 is brought into contact to the brake rotor 12 by an electromagnetic force established by energizing the coil 14.

A brake torque is applied to the brake rotor 12 by frictionally contacting the brake stator 13 to the brake rotor 12. Thus, the brake stator 13, the brake rotor 12, and the coil 14 form a friction brake 15.

An extension shaft 16 is attached to the leading end of the first output shaft 3R closer to the width center of the vehicle than the first output gear 4R. An annular clutch disc 17 is fitted onto the extension shaft 16 to be rotated integrally therewith.

A bottomed-cylindrical cover shaft 18 holding the clutch disc 17 in a hollow space is attached to the leading end of the second output shaft 3L closer to the width center of the vehicle than the second output gear 4L.

An annular pressure plate 19 is interposed between a bottom face of the cover shaft 18 and the clutch disc 17. The pressure plate 19 is made of magnetic material, and is splined into the cover shaft 18 to be rotated integrally with the cover shaft 18 while being allowed to move in the axial direction of the cover shaft 18.

A spring 20 is interposed between the bottom face of the cover shaft 18 and the pressure plate 19 to push the pressure plate 19 toward the clutch disc 17.

A coil 21 is provided on the outer side of the cover shaft 18. The coil 21 generates an electromagnetic force upon being energized, so that the pressure plate 19 is isolated away from the clutch disc 17 against a spring force of the spring 20.

The clutch disc 17, the pressure plate 19, the spring 20, and the coil 21 form an electromagnetic clutch (to be simply referred to as a clutch hereinafter) 22. When the coil 21 is not energized, the clutch disc 17 and the pressure plate 19 are contacted to each other by the spring force of the spring 20 to be rotated integrally. When the coil 21 is energized, a torque transmitting capacity between the clutch disc 17 and the pressure plate 19 is set in accordance with the electric power applied to the coil 21.

Thus, the first motor 2R and the second motor 2L can be rotated integrally while transmitting a torque therebetween by frictionally engaging the pressure plate 19 and the clutch disc 17 without energizing the coil 21, A torque transmitting capacity between the pressure plate 19 and the clutch disc 17 can be reduced by energizing the coil 21. As a result, the first motor 2R and the second motor 2L rotate relatively to each other, whereby a torque transmitted between the first motor 2R and the second motor 2L can be reduced.

The brake torque applied to the drive wheels 11R and 11L cannot be maintained when the power is off to park the vehicle. In order to maintain a frictional contact between the first brake rotor 12R and the first brake stator 13R thereby halting the drive wheels 11R and 11L even when the power is off, the drive unit 1 is provided with a parking lock device 23. Specifically, the parking lock device 23 comprises an annular movable plate 24 opposed to the first brake rotor 12R across the first brake stator 13R, a feed screw mechanism 25, and a brake motor 26 that actuates the feed screw mechanism 25.

The feed screw mechanism 25 is adapted to translate a rotary motion of the brake motor 26 into a linear motion thereby pushing the movable plate 24 toward the first brake stator 13R so as to bring the first brake stator 13R into frictional contact to the first brake rotor 12R. That is, the feed screw mechanism 25 keeps the first output shaft 3R stopping even if current supply to the brake motor 26 is interrupted. Thus, the feed screw mechanism 25 generates forward thrust force by generating forward torque by the brake motor 26, and the forward thrust force is applied to the first brake stator 13R. Consequently, the first brake stator 13R is frictionally engaged with the first brake rotor 12R to halt the first output shaft 3R. By contrast, the first output shaft 3R is allowed to rotate by generating a reverse torque by the brake motor 26 to withdraw the first brake stator 13R from the first brake rotor 12R. That is, the brake force for stopping the rotation of the first output shaft 3R is cancelled.

Specifically, reversed efficiency of the feed screw mechanism 25 to translate the linear motion into the rotational motion is adjusted to be lower than forward efficiency to translate the rotational motion into the linear motion. According to an embodiment, therefore, the first output shaft 3R may be halted by pushing the movable plate 24 and the first brake stator 13R toward the first brake rotor 12R by the feed screw mechanism 25. Therefore, the first output shaft 3R may be halted by the parking lock device 23 even if the current supply to the first coil 14R and the brake motor 26 is stopped while the feed screw mechanism 25 is operated by the brake motor 26 and the first output shaft 3R is halted.

Thus, when the vehicle is parked, the current supply to the coil 21 is stopped and hence the clutch 22 is brought into engagement. In this situation, therefore, rotation of the second output shaft 3L is also stopped by stopping the rotation of the first output shaft 3R by the parking lock device 23. In other words, the brake torques applied to the drive wheels 11R and 11L can be maintained. The parking lock device 23 may be arranged in such a manner as to stop the rotation of the second output shaft 3L, or may be arranged in such a manner as to stop the rotation of the first countershaft 5R instead of the first output shaft 3R, for example.

As described, in the drive unit 1, the right and the left drive wheels 11R and 11L may be rotated integrally to propel the vehicle by engaging the clutch 22 completely to apply the same torques to the right and the left drive wheels 11R and 11L. For example, the vehicle can be propelled by a torque generated by at least one of the first motor 2R and the second motor 2L. In this case, the torque generated by one of the first motor 2R and the second motor 2L may be regenerated partially by the other one of the motors. Further, one of the first motor 2R and the second motor 2L can generate a large torque, and the other one of the motors can generate a torque in an amount corresponding to the shortage. Thus, output torques of the motors 2R and 2L can be adjusted as appropriate.

When the right and the left drive wheels 11R and 11L are rotated relative to each other during turning or the other like occasions, or when differentiating torques transmitted to the right and the left drive wheels 11R and 11L, the vehicle can be propelled by generating a torque by at least one of the motors 2R and 2L while causing a slip in the clutch 22. Further, the vehicle can be propelled by generating the drive torque by one of the motors 2R and 2L while regenerating part of the drive torque by the other one of the motors 2R and 2L. For this purpose, the output torques of the motors 2R and 2L can be adjusted as appropriate.

When a speed difference or a torque difference between the right and the left drive wheels 11R and 11L is equal to or larger than a predetermined value, the outputs of the right and the left drive wheels 11R and 11L may be appropriately adjusted by completely disengaging the clutch 22. In this situation, the motor 2R (2L) connected to the outer wheel may be operated as a motor and the motor 2R (2L) connected to the inner wheel may be operated as a generator. Instead, only the motor 2R (2L) connected to the outer wheel may be operated to generate a torque.

Figure 2:
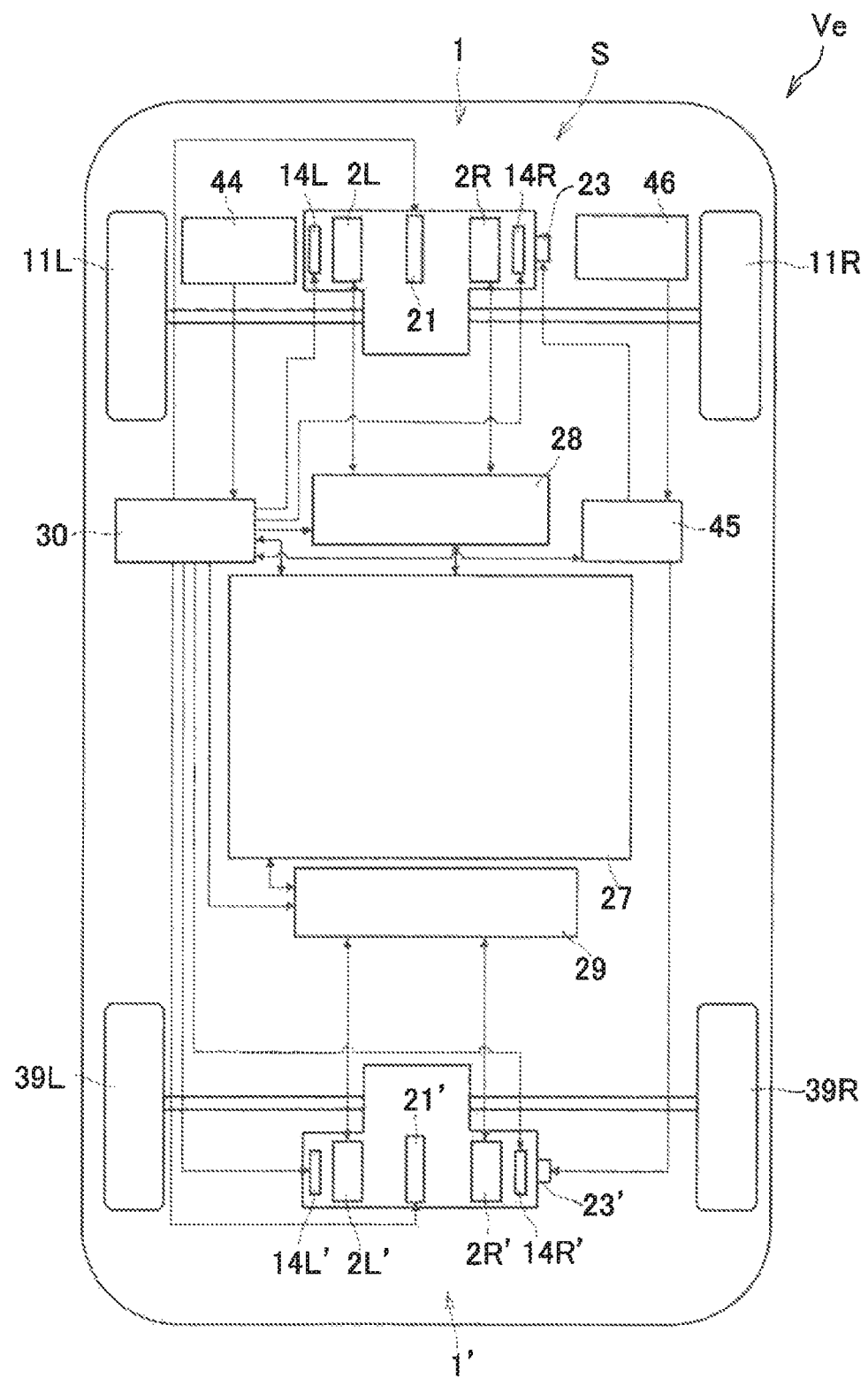
FIG. 2 is a schematic illustration showing one example of a vehicle to which the control system according to the embodiment is applied.

Next, an example of a configuration of a control system S for a vehicle Ve including the drive unit 1 described above will be described. FIG. 2 is a diagram schematically showing an example of the configuration of the system. As illustrated in FIG. 2, the vehicle Ve is a four wheel drive (4WD) layout vehicle in which a first drive unit 1 is arranged in the front side of the vehicle Ve and a second drive unit 1' is arranged in the rear side of the vehicle Ve substantially symmetrical across the longitudinal center of the vehicle Ve. In the flowing explanation, the members of the second drive unit 1' with the same configuration as the members (including the first motor 2R) provided in a torque transmission path between the first motor 2R and the right drive wheel 11R in the first drive unit 1 will be called the "third member". The members of the first drive unit 1 with the same configuration as the members (including the second motor 2L) provided in a torque transmission path between the second motor 2L and the left drive wheel 11L in the first drive unit 1 will be called the "fourth member". The clutch and the parking lock device in the second drive unit 1', as well as the members of these, will be called a "second clutch", a "second parking lock device", and the "second member". The apostrophe on the reference numeral designates members of the second drive unit 1', for the distinction from the members of the first drive unit 1.

In the first drive unit 1, the first motor 2R, the second motor 2L, and the coils 14R, 14L, and 21 receive electric power from a high-voltage power storage device 27 including a battery and a capacitor, as a conventional power storage device used in hybrid vehicles and electric vehicles. Likewise, in the second drive unit 1', the first motor 2R, the second motor 2L', and the coils 14R', 14l1, and 21' also receive the electric power from the power storage device 27. The power storage device 27 is charged with the power generated by the motors 2R, 2L, 2R', and 2L'. The power storage device 27 serves as an "electrical power source" in the embodiment.

A first inverter 28 is interposed between the power storage device 27 and the motors 2R and 2L, and the first inverter 28 is adapted to switch between direct current and alternate current, and to control values and frequencies of current supplied to the motors 2R and 2L. The second drive unit 1' is also provided with a second inverter 29 that can control a value and a frequency of the current supplied to the motors 2R' and 2E.

Figure 3:
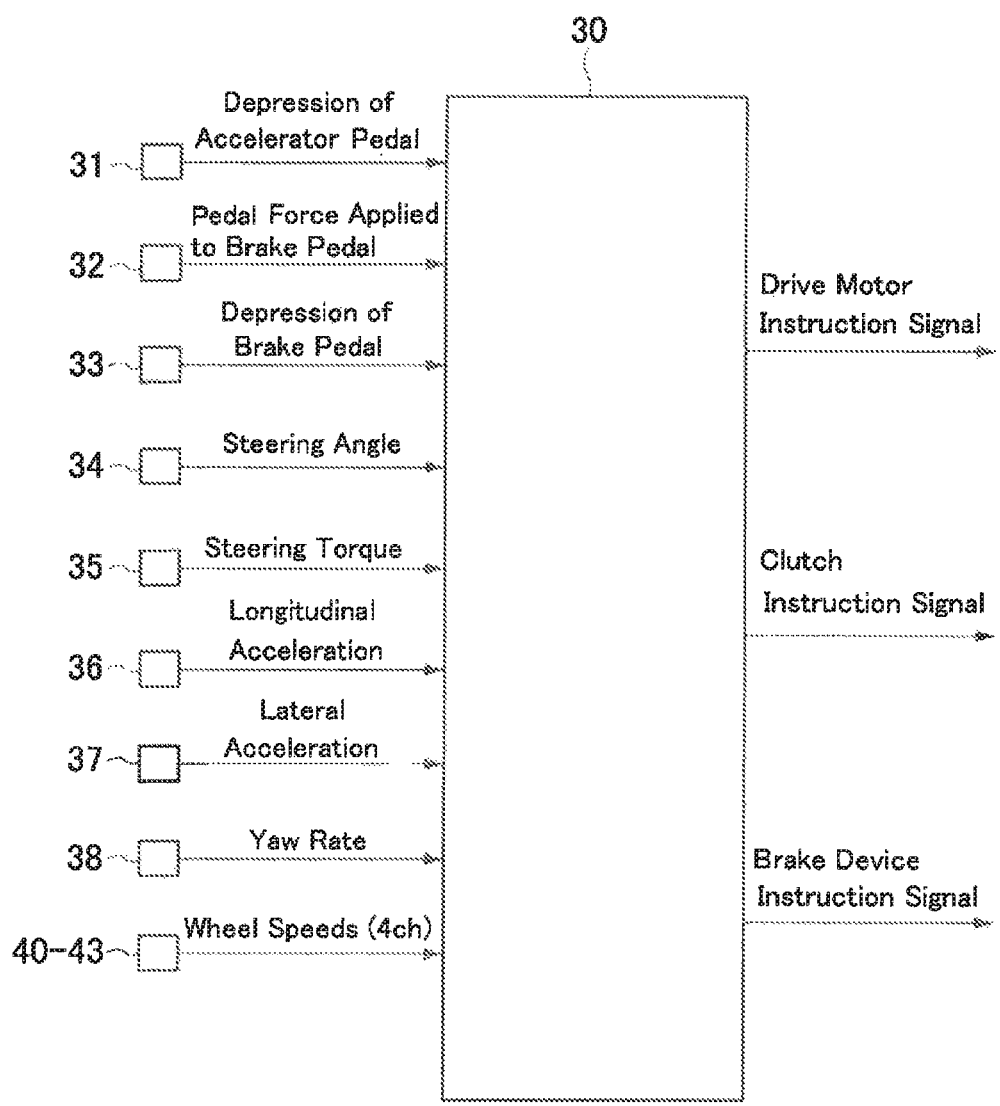
FIG. 3 is a block diagram showing functions of a first ECU.

A first electronic control unit 30 (to be abbreviated as the "first ECU" hereinafter) is provided to control the motors 2R and 2L and the coils 14R, 14L, and 21 of the first drive unit 1, as well as the motors 2R' and 2L' and the coils 14R', 14L', and 21' of the second drive unit 1'. The first ECU 30 as a "controller" of the embodiment mainly includes a microcomputer as in any known ECUs installed in vehicles. FIG. 3 is a block diagram illustrating functions of the first ECU 30.

Signals representing posture of the vehicle Ve and operating conditions are sent to the first ECU 30, and the first ECU 30 transmits control signal to the first inverter 28 and the second inverter 29 based on the incident signals, preinstalled formulas and maps, and the like. The control signal, sent from the first ECU 30 to the first inverter 28 and the second inverter 29, is obtained while taking account of conventionally known Antilock Brake system (ABS), Traction Control (TRC), Electronic Stability Control (ESC), Dynamic Yaw rate Control (DYC), and the like.

For example, the first ECU 30 receives signals from an accelerator sensor 31 that detects a depression of an accelerator pedal, a first brake pedal sensor 32 that detects a pedal force applied to the brake pedal, a second brake pedal sensor 33 that detects a depression of the brake pedal, a steering angle sensor 34 that detects a steering angle, and a torque sensor 35 that detects a steering torque. For example, the first ECU 30 also receives signals representing data about the posture of the vehicle Ve, from a first G sensor 36 that detects longitudinal acceleration of the vehicle Ve, a second G sensor 37 that detects lateral acceleration of the vehicle Ve, a yaw rate sensor 38 that detects a yaw rate of the vehicle Ve, and wheel speed sensors 40, 41, 42, and 43 that respectively detect rim speeds of the right front wheel 11R, the left front wheel 11L, the right rear wheel 39R, and the left rear wheel 39L.

A first auxiliary battery 44 is provided to supply power for operating the first ECU 30 and for controlling a transistor (not illustrated) installed in the first inverter 28. The first auxiliary battery 44 is set to be at a lower voltage than the power storage device 27.

Figure 4:
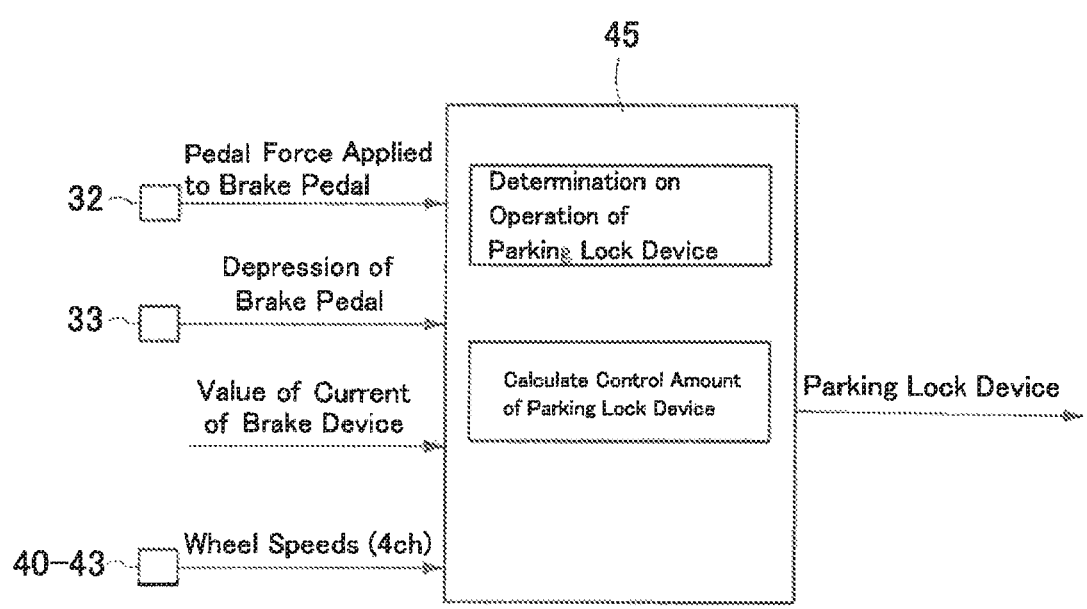
FIG. 4 is a block diagram showing functions of a second ECU.
Figure 5:
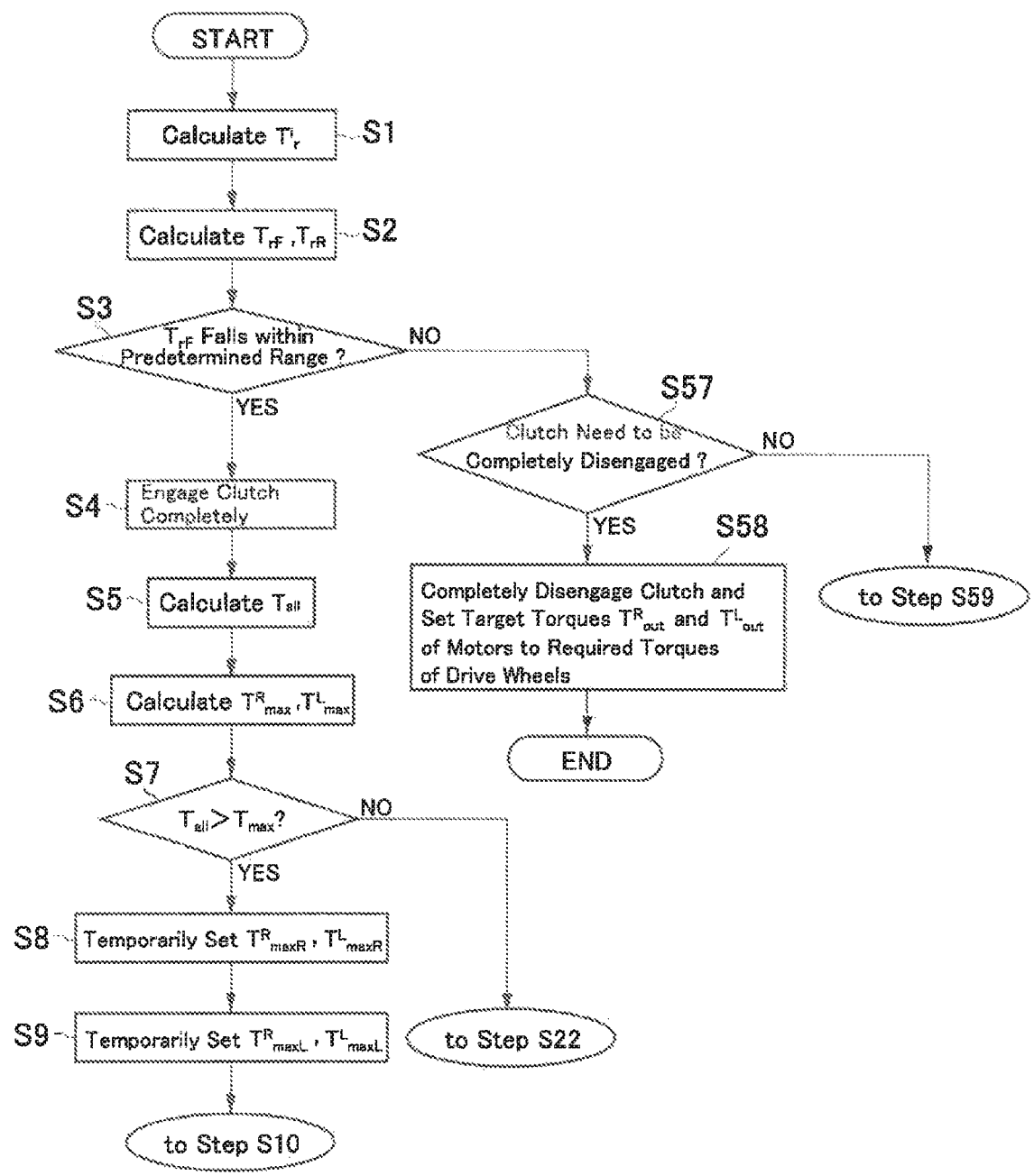
FIG. 5 is a flowchart showing step S1 to step S9 of a routine executed by a drive force control system according to the embodiment.

Preferably, the parking lock device 23 may be controlled in the event of failure of electric system between the first ECU 30 and the first auxiliary battery 44 resulting in failure to power supply to the coils 14R, 14L, and 21, and in the event of failure of electric system between the power storage device 27 and the first inverter 28. To this end, in the example illustrated in FIG. 2, a second ECU 45 is provided independently from the first ECU 30. The second ECU 45 is electrically connected to the parking lock devices 23 and 23° (specifically, the brake motors 26 and 26'). The second. ECU 45 mainly includes a microcomputer as in the case of the first ECU 30. FIG. 4 is a block diagram illustrating the configuration of the second ECU 45.

Signals representing posture of the vehicle Ve and operating conditions are sent to the second ECU 45. The ECU 45 is configured to determine whether or not to operate each of the parking lock devices 23 and 23' based on the incident signals, preinstalled formulas and maps, and the like. The ECU 45 determines a control amount for each of the parking lock devices 23 and 23' through calculations or the like, and outputs a control signal to each of the parking lock devices 23 and 23' based on the control amount thus determined.

For example, the second ECU 45 receives signals from sensors (not illustrated) that detect values of current supplied to the first brake pedal sensor 32, the second brake pedal sensor 33, and the friction brakes 15R, 15L, 15R', and 15L', and receives signals representing data about the posture of the vehicle Ve from the wheel speed sensors 40, 41, 42, and 43. A condition to operate each of the parking lock devices 23 and 23' is satisfied based upon satisfaction of at least one of the following conditions. Specifically, the conditions to operate each of the parking lock devices 23 and 23' is satisfied when the vehicle has been parked for a predetermined period of time, when a switch to operate each of the brake motors 26 and 26' is turned ON, when the vehicle has been parked while the ignition key is turned OFF and when at least one of the friction brakes 15R, 15L, 15R', and 15L' cannot operate.

The brake torques of the parking lock devices 23 and 23' are obtained based on the pedal force and the depression of the brake pedal and the wheel speed of each of the drive wheels 11R, 11L, 39R, and 39L, and current for achieving such brake torques is supplied to the brake motors 26 and 26'. A second auxiliary battery 46 is provided to supply power for operating the second ECU 45 and for controlling the parking lock devices 23 and 23'. The second ECU 45 may be configured to receive the signals supposed to be sent to the first ECU 30, and to operate in the event of failure of the first ECU 30.

Next, a control example for determining the output of each of the motors 2R, 2L, 2R', and 2L' will be described. Routines illustrated in FIGS. 5 to 20, illustrating the control example, are executed by the first ECU 30. The routines in flowcharts illustrated in FIGS. 5 to 20 may be implemented as a single routine, but are separately illustrated in FIGS. 5 to 20 for the sake of explanation. The flowing explanation is given on the basis that each of gear ratios between the motors 2R, 2L, 2R', and 2L' and a respective one of the drive wheels 11R, 11L, 39R, and 39L is "1" for the sake of convenience.

At step S1, required torques $T^i_r$ of the drive wheels 11R, 11L, 39R, and 39L are calculated based on the position of the accelerator pedal, the depression and the pedal force on the brake pedal, the steering angle, and the wheel speed detected by each of the wheel speed sensors 40, 41, 42, and 43, the longitudinal acceleration, and the like. For example, Japanese Patent Application No. 2015-253254 discusses control for obtaining the required torque $T^i_r$ each of the drive wheels 11R, 11L, 39R, and 39L in detail.

At step S2, a torque ratio $T_{rF}$ of the pair of front wheels and a torque ratio $T_{rR}$ of the pair of rear wheels are obtained based on the required torques $T^i_r$ of the drive wheels 11R, 11L, 39R, and 39L calculated at step S1. For a 2WD vehicle, the torque ratio $T_{rF}$ ($T_{rR}$) between the right front wheel 11R and the left front wheel 11L or the right rear wheel 39R and the left rear wheel 39L serving as the drive wheels may be obtained.

In the following explanation, the control for obtaining torques of the motors 2R and 2L for driving the front wheels is described for example. For a 4WD vehicle, the same control may be performed for the front wheels and for the rear wheels.

At step S3, it is determined whether or not the torque ratio $T_{rF}$ between the right front wheel 11R and the left front wheel 11L falls within a predetermined range. Specifically, at step S3, it is determined whether or not there needs to differentiate torques to be transmitted to the right and the left drive wheels 11R and 11L. In other words, it is determined whether or not the clutch 22 is required to cause a slip or to be disengaged. The "predetermined range" at step S3 is a predetermined range with "1" set at the center. This range is determined in advance based on experiments and simulations.

When travelling along a straight line or when a turning radius is relatively small, the torque ratio $T_{rF}$ between the right front wheel 11R and the left front wheel 11L is substantially "1" so that the answer of step S3 will be YES. In this case, the routine progresses to step S4 to engage the clutch 22 completely. To this end, the command pressure of the clutch 22 is maximized. Specifically, the coil 21 is not energized to allow the first motor 2R and the second motor 2L to rotate at the same speed and to transmit torque therebetween.

Then, at step S5, a required torque $T_{all}$ of the first drive unit 1 is calculated. In other words, a total value of torques to be transmitted to the right front wheel 11R and the left front wheel 11L is calculated. The calculation at step S5 can be carried out based on the depression of the accelerator pedal, the depression of the brake pedal, a vehicle speed detected by the vehicle speed sensor, and the like, as in the case of conventionally known control.

Thereafter, at step S6, the output torques $T^R_{max}$ and $T^L_{max}$, for achieving the maximum efficiency, are respectively obtained for the motors 2R and 2L. The efficiency of the motors 2R and 2L is a ratio between the input power to the motor 2R, 2L and the drive force generated by the motor 2R, 2L. The calculation at this step S6 can be made with reference to the map stored in the first ECU 30 in advance and based on the current speed of each of the motors 2R and 2L corresponding to the wheel speed. The output torques $T^R_{max}$ and $T^L_{max}$ respectively correspond to the "efficient torque of the first motor" and the "efficient torque of the second motor" in the embodiment.

Figure 6:
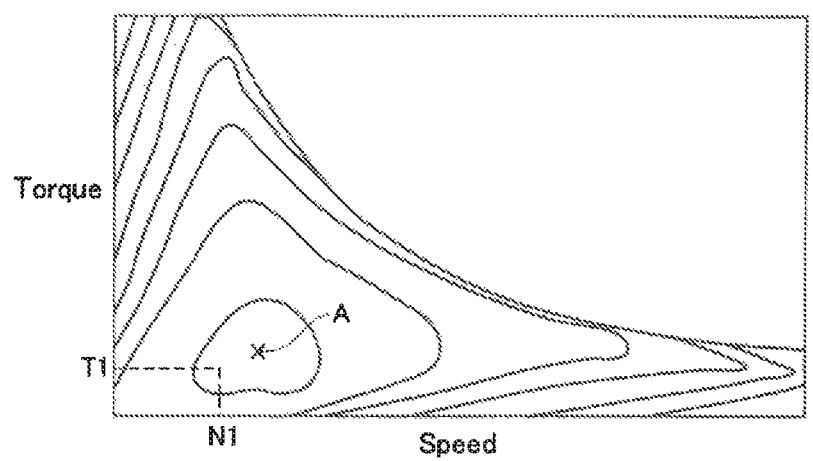
FIG. 6 is a graph schematically showing characteristics (efficiency) of a motor.
Figure 7:
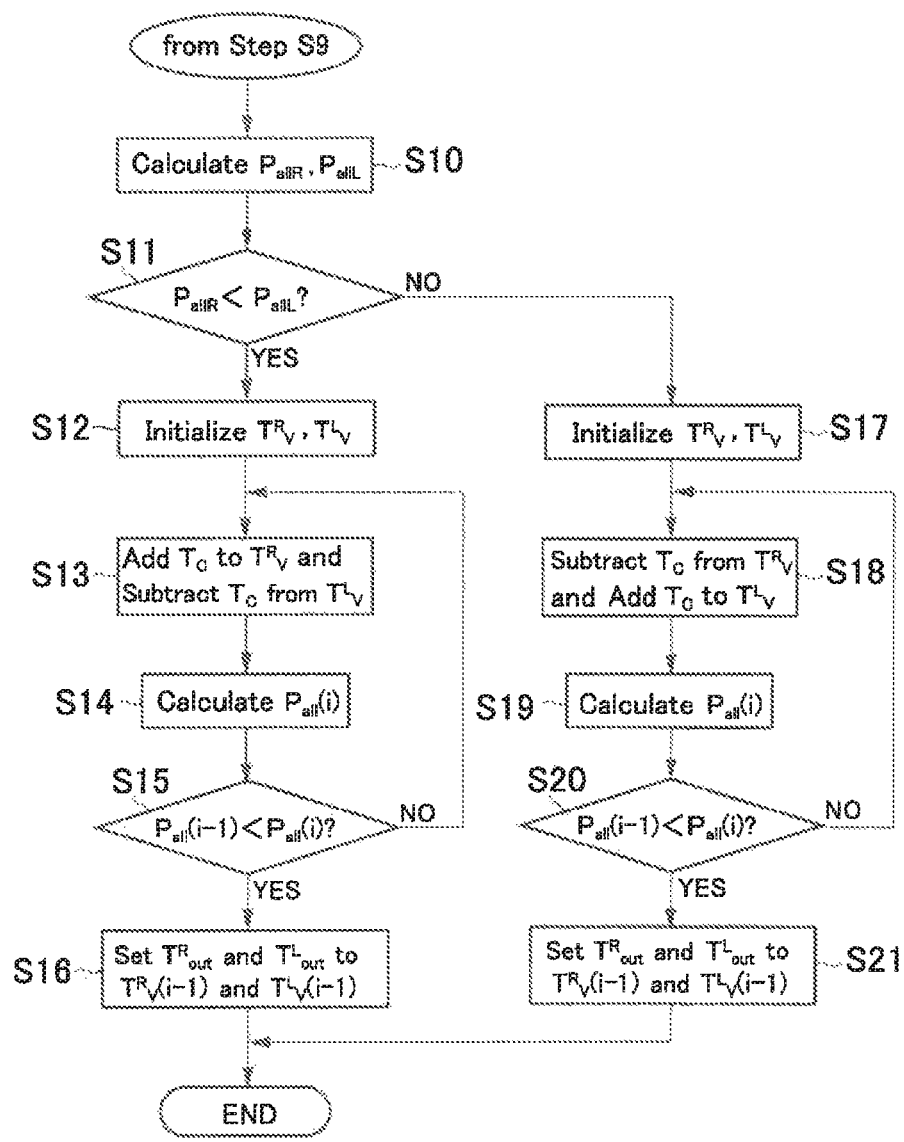
FIG. 7 is a flowchart showing step S10 to step S21 in a control example for the drive force control system according to the embodiment.

FIG. 6 illustrates an example of the map. In the map shown in FIG. 6, the horizontal axis represents the speed, and the vertical axis represents the torque, and a curve connects the operating points of the same efficiency. A point "A" in the map represents the optimum operating point. The efficiency is reduced (or lowered) with a distance from the operating point "A". For example, when the speed of the motor is N1 in FIG. 6, T1 in FIG. 6 is the torque calculated at step S6. The characteristics of the motors 2R and 2L can be obtained through experiments and the like, and are stored in the first ECU 30 in advance for the motors 2R and 2L. This example in FIG. 6, illustrating relationship between the drive torque and the speed, similarly applies to the relationship between the brake torque and the speed.

Thereafter, at step S7, it is determined whether or not the required torque $T_{all}$ is greater than the total value (to be referred to as a total torque hereinafter) of the output torques $T^R_{max}$ and $T^L_{max}$ of the motors 2R and 2L calculated at step S6. If the required torque $T_{all}$ is greater than the total torque $T_{max}$ so that the answer of step S7 is YES, it is determined that a power consumption $P_{all}$ of the power storage device 27 can be reduced in which case that the torque of the first motor 2R is set to improve efficiency of the first motor 2R (to be referred to as a case where the first motor 2R is mainly controlled), or that the torque of the second motor 2L is set to improve efficiency of the second motor 2L (to be referred to as a case where the second motor 2L is mainly controlled). This is because characteristics of the first motor 2R and the second motor 2L are different.

For this purpose, at step S8, torques $T^R_{maxR}$ and $T^L_{maxR}$ of the motors 2R and 2L in the case where the first motor 2R is mainly controlled are temporarily set. Specifically, the output torque $T^R_{maxR}$ of the first motor 2R is temporarily set as the torque $T^R_{max}$ corresponding to the operating point at which the first motor 2R can be operated in an efficient manner. The output torque $T^L_{maxR}$ of the second motor 2L is temporarily set as a difference between the required torque $T_{all}$ and the temporarily set torque $T^R_{maxR}$ of the first motor 2R, that is, the shortage of the total value of the torques to be transmitted to the drive wheels 11R and 11L from the required torque $T_{all}$ as the torque of the second motor 2L.

Likewise, at step S9, the torques $T^R_{maxL}$ and $T^L_{maxL}$ of the motors 2R and 2L in the case where the second motor 2L is mainly controlled are temporarily set. Specifically, the output torque $T^L_{maxL}$ of the second motor 2L is temporarily set as the torque $T^L_{max}$ corresponding to the operating point at which the second motor 2L can be operated in an efficient manner. The output torque $T^R_{maxL}$ of the first motor 2R is temporarily set as a difference between the required torque $T_{all}$ and the temporarily set torque $T^L_{maxL}$ of the second motor 2L, that is, the shortage of the total value of the torques to be transmitted to the drive wheels 11R and 11L from the required torque $T_{all}$ as the torque of the first motor 2R.

Thereafter, at step S10, a power consumption amount $P_{allR}$ of the power storage device 27 in the case where the first motor 2R is mainly controlled and a power consumption amount $P_{allL}$ of the power storage device 27 in the case where the second motor 2L is mainly controlled are calculated. The power consumption amount of the power storage device 27 can be obtained as a sum of a value obtained by dividing the output of the first motor 2R (the energy amount based on the product of the torque and the speed) by the efficiency and a value obtained by the dividing output of the second motor 2L by the efficiency. The power consumption amount $P_{allR}$ corresponds to the "first power consumption amount" in the embodiment. The power consumption amount $P_{allL}$ corresponds to the "second power consumption amount" in the embodiment.

Thereafter, at step S11, it is determined whether or not the power consumption amount $P_{allR}$ of the power storage device 27 in the case where the first motor 2R is mainly controlled is smaller than the power consumption amount $P_{allL}$ of the power storage device 27 in the case where the second motor 2L is mainly controlled. Specifically, it is determined whether or not the first drive unit 1 as a whole can be more efficiently operated in the case where the first motor 2R is mainly controlled than in the case where the second motor 2L is mainly controlled.

When the first drive unit 1 as a whole can be more efficiently operated in the case where the first motor 2R is mainly controlled than in the case where the second motor 2L is mainly controlled so that the answer of step S11 is YES, the routine progresses to step S12 to initialize variables $T^R_v$ and $T^L_v$ for searching for the torques of the motors 2R and 2L that maximize the efficiency of the first drive unit 1 as a whole. Specifically, the variable $T^R_v$ for searching for the torque of the first motor 2R, is set to be the torque $T^R_{maxR}$ set at step S8, and the variable $T^L_v$ for searching for the torque of the second motor 2L, is set to be the torque $T^L_{maxR}$ set at step S8. The first motor 2R and the second motor 2L, in the case where the answer of step S11 is YES, respectively correspond to the "first controlled motor" and the "second controlled motor" in the embodiment.

Thereafter, at step S13, a predetermined value $T_c$ is added to the variable $T^R_v$ for searching for the torque of the first motor 2R currently set, and the predetermined value $T_c$ is subtracted from the variable $T^L_v$ for searching for the torque of the second motor 2L currently set. The same predetermined value $T_c$ is used for the addition and the subtraction. Thus, the torques of the motors 2R and 2L are adjusted without changing the torque output from the first drive unit 1. The variable (torque) $T^R_v$ for searching for the torque of the first motor 2R, as a result of adding the predetermined value $T_c$ corresponds to a "first provisional torque" in the embodiment. The variable $T^L_v$ for searching for the torque of the second motor 2L, as a result of subtracting the predetermined value T corresponds to a "second provisional torque" in the embodiment.

At step S14, a power consumption amount $P_{all}(i)$ of the power storage device 27 is calculated based on the variables $T^R_v$ and $T^L_v$ that have been replaced at step S13 (currently set variables). The calculation at step S14 can be performed in a manner similar to that at step S10 described above. In the following explanation, (i) designates a parameter calculated based on the variables $T^R_v$ and $T^L_v$ currently set.

Figure 8:
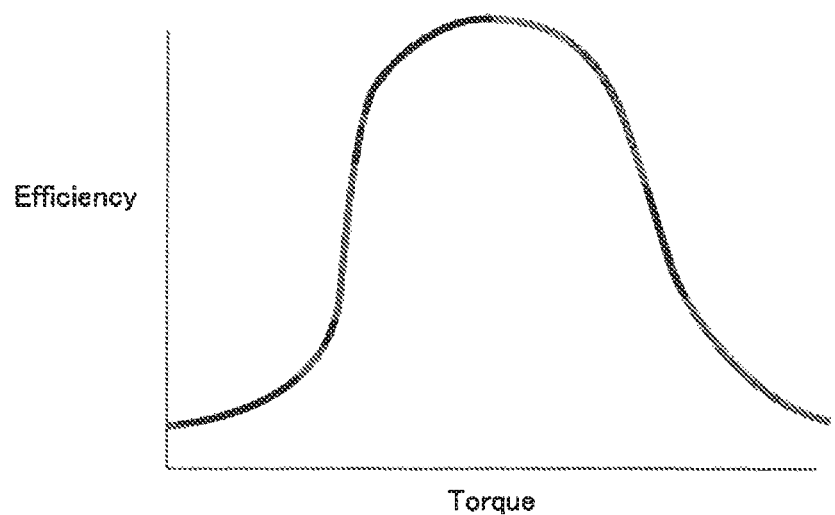
FIG. 8 is a graph schematically showing relationship between a torque of a first motor and efficiency of a first drive unit as a whole, under a condition of generating a required torque.
Figure 9:
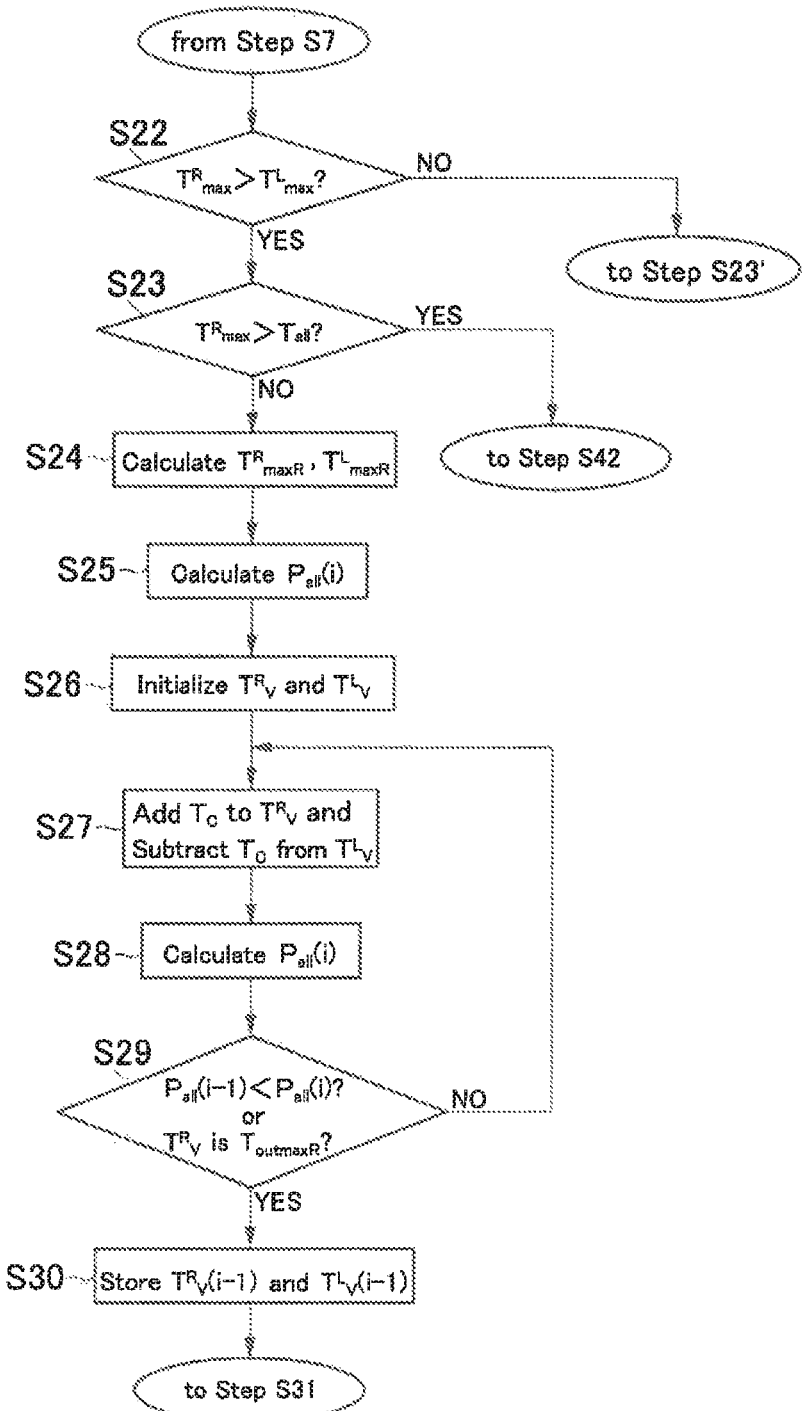
FIG. 9 is a flowchart showing step S22 to step S30 in the control example for the drive force control system according to the embodiment.
Figure 10:
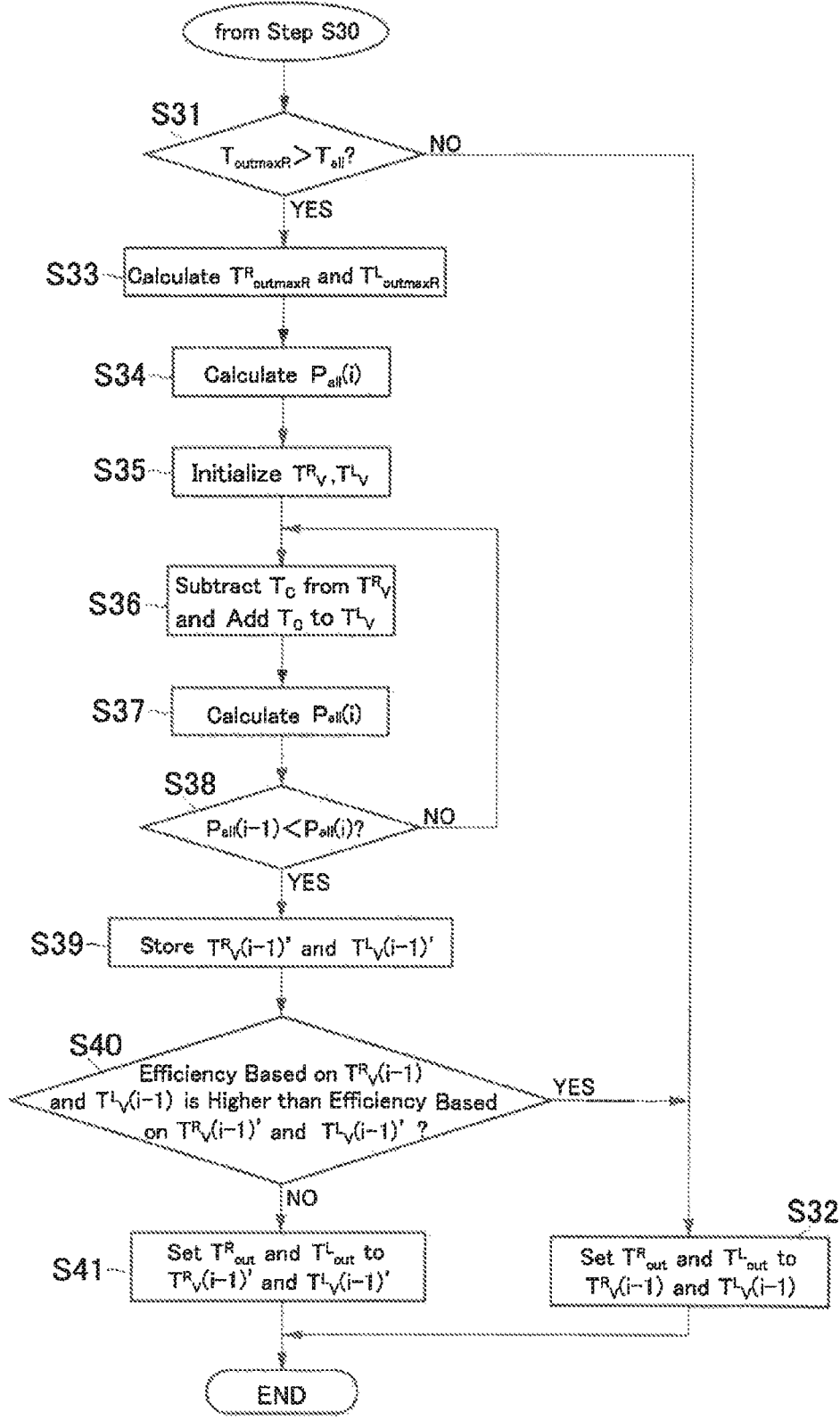
FIG. 10 is a flowchart showing step S31 to step S41 in the control example for the drive force control system according to the embodiment.
Figure 11:
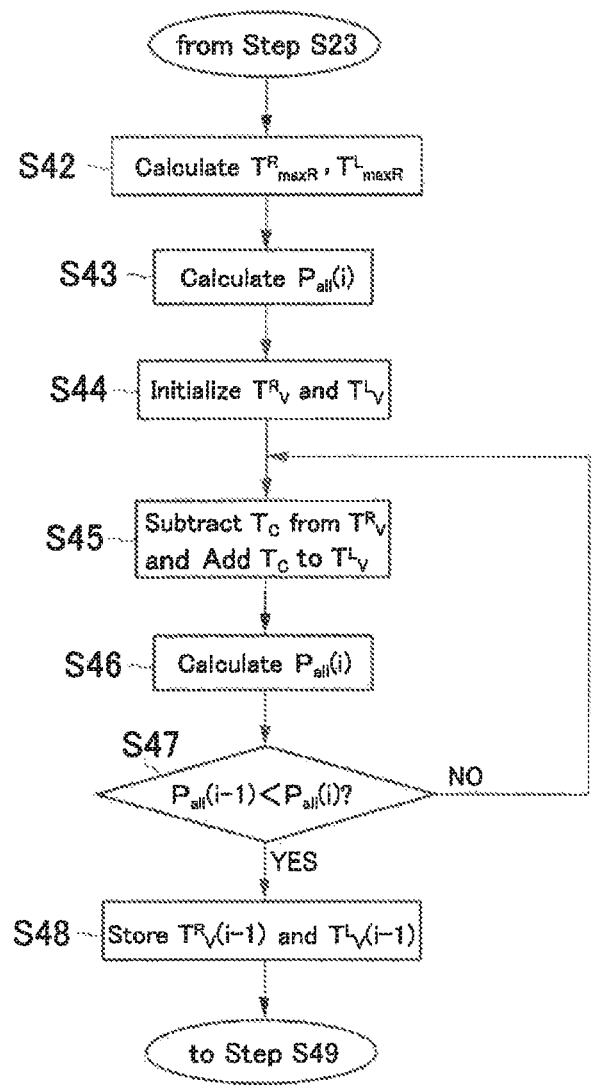
FIG. 11 is a flowchart showing step S42 to step S48 in the control example for the drive force control system according to the embodiment.
Figure 12:
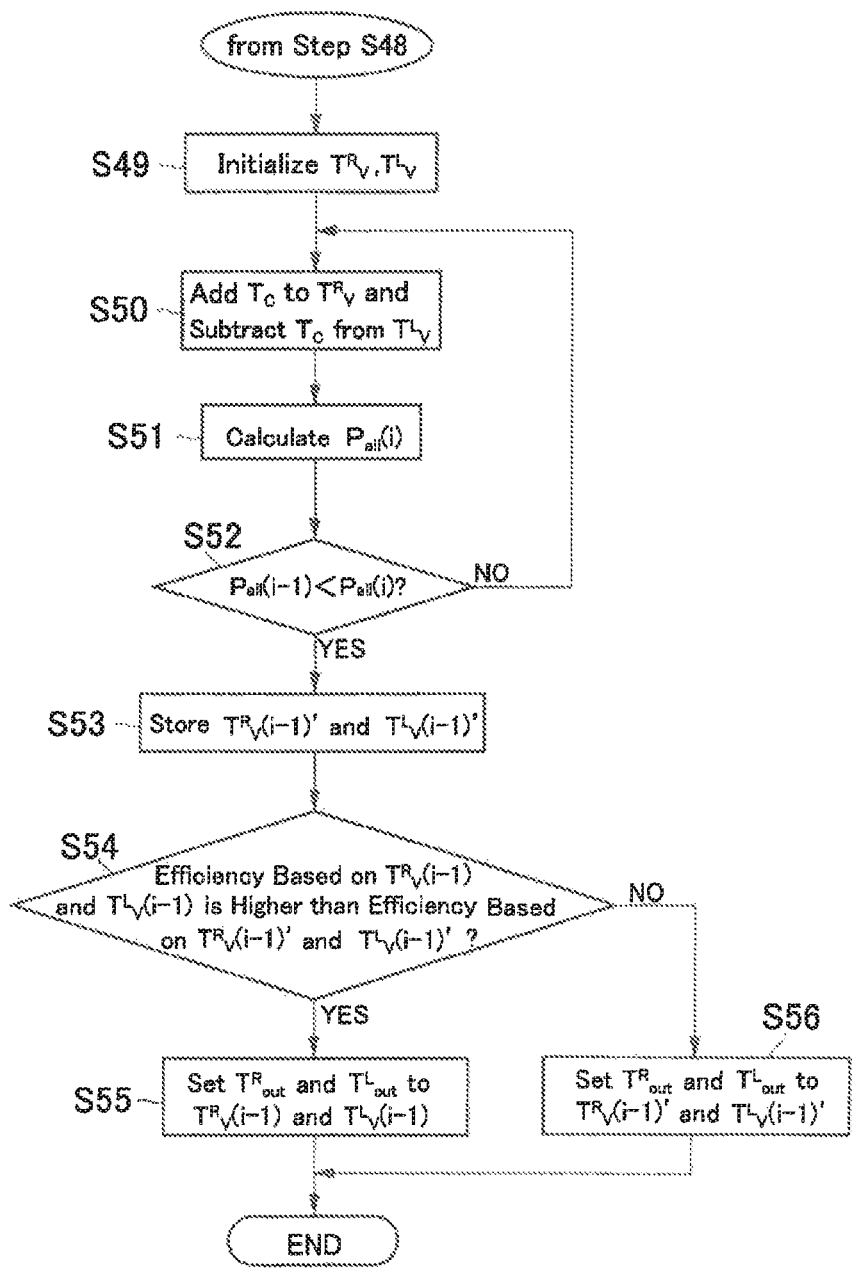
FIG. 12 is a flowchart showing step S49 to step S56 in the control example for the drive force control system according to the embodiment.
Figure 13:
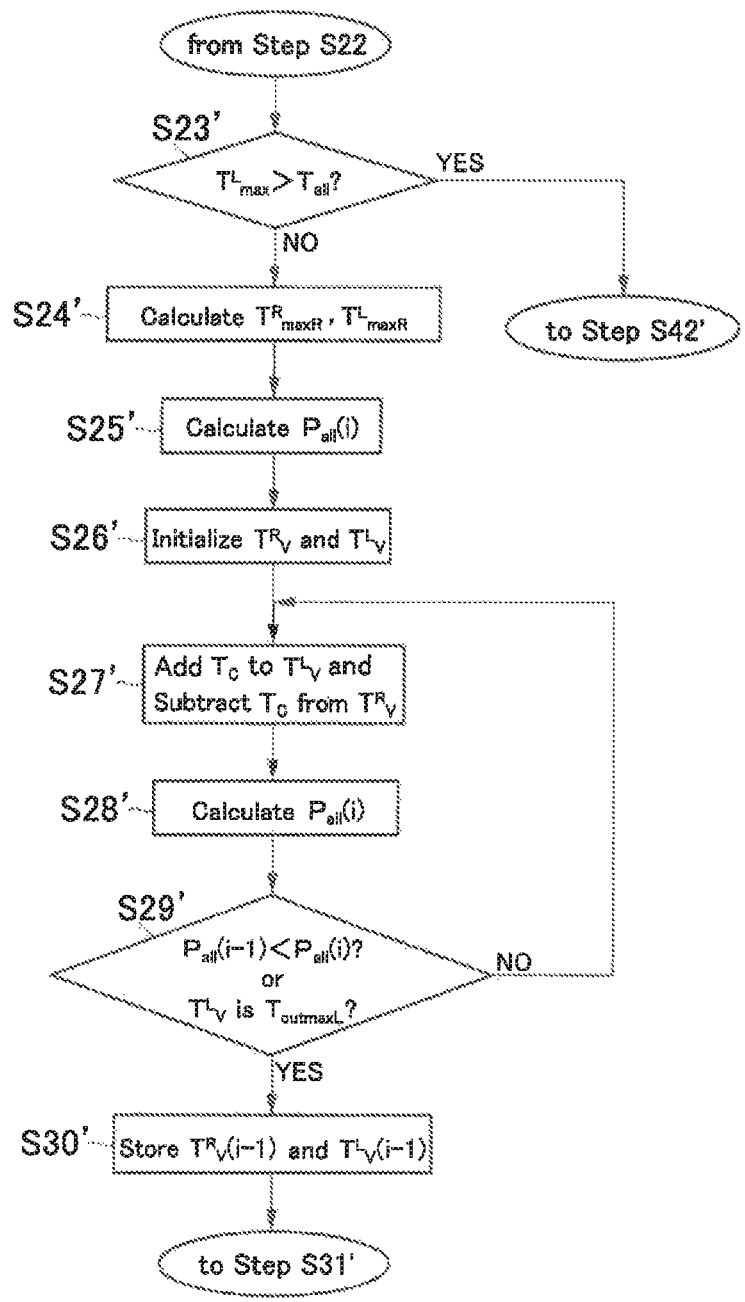
FIG. 13 is a flowchart showing step S23' to step S30' in the control example for the drive force control system according to the embodiment.
Figure 14:
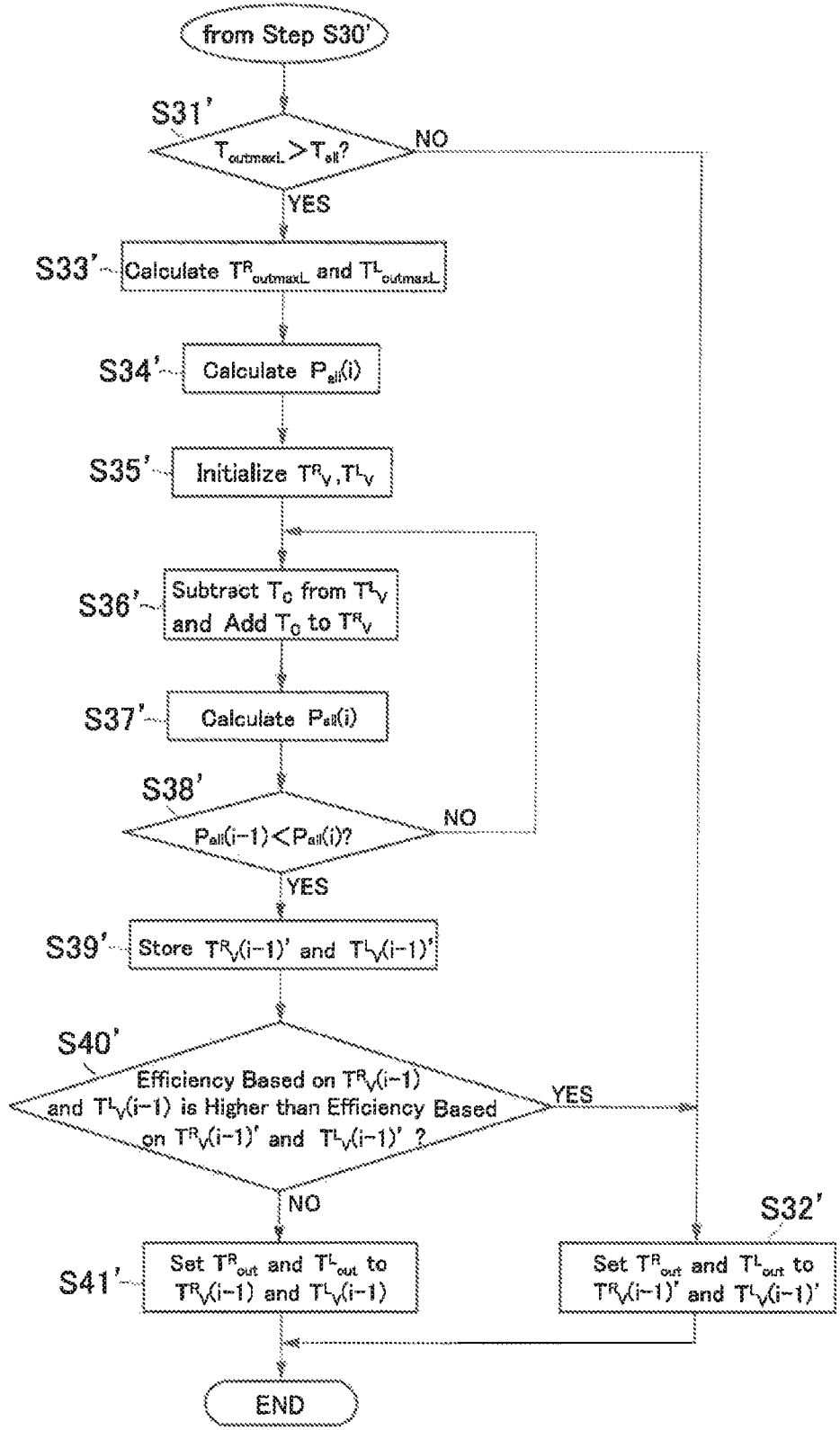
FIG. 14 is a flowchart showing step S31' to step S41' in the control example for the drive force control system according to the embodiment.
Figure 15:
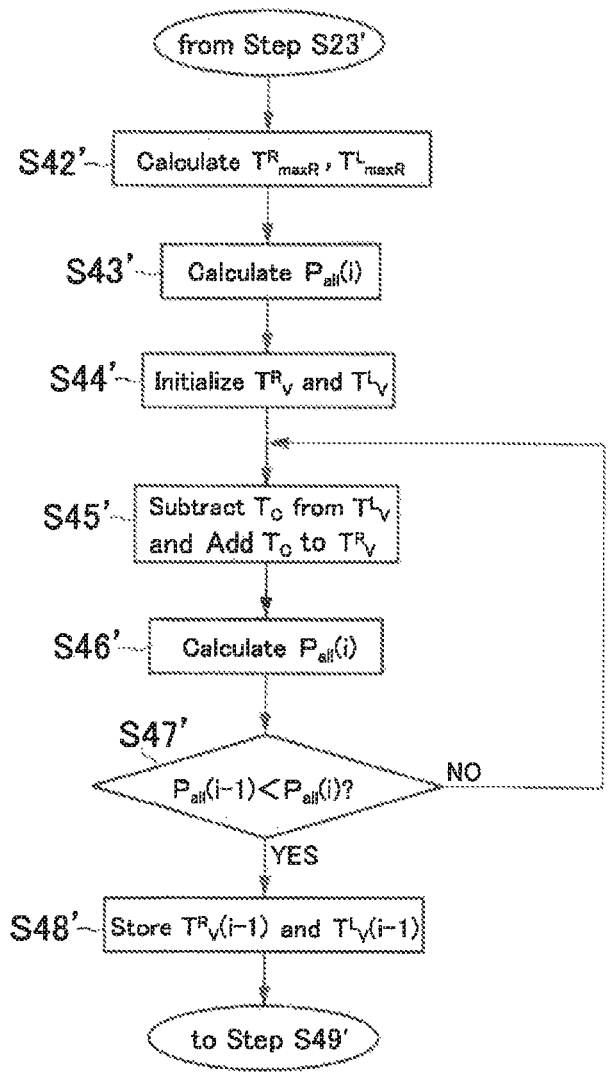
FIG. 15 is a flowchart showing step S42' to step S48' in the control example for the drive force control system according to the embodiment.
Figure 16:
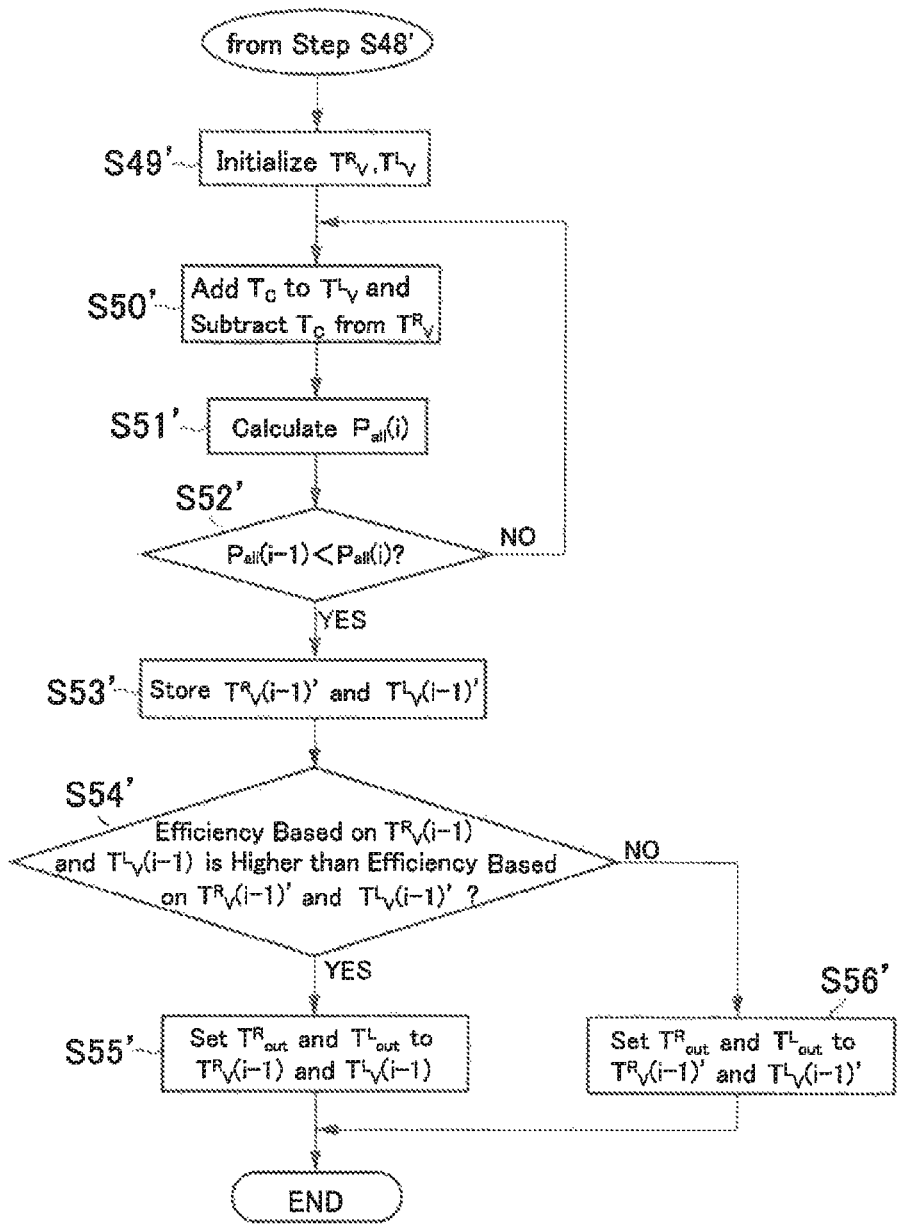
FIG. 16 is a flowchart showing step S49' to step S56' in the control example for the drive force control system according to the embodiment.
Figure 17:
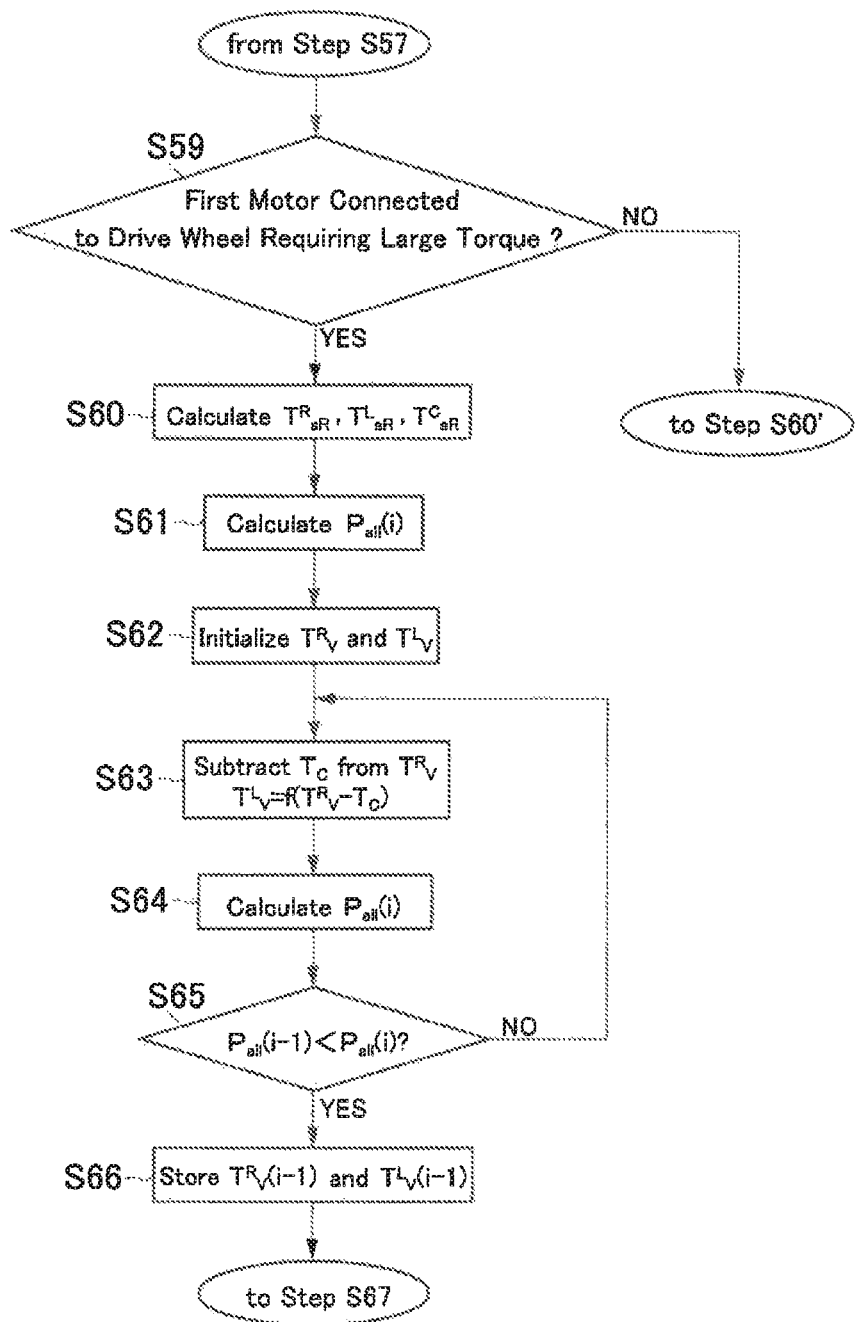
FIG. 17 is a flowchart showing step S59 to step S66 in the control example for the drive force control system according to the embodiment.
Figure 18:
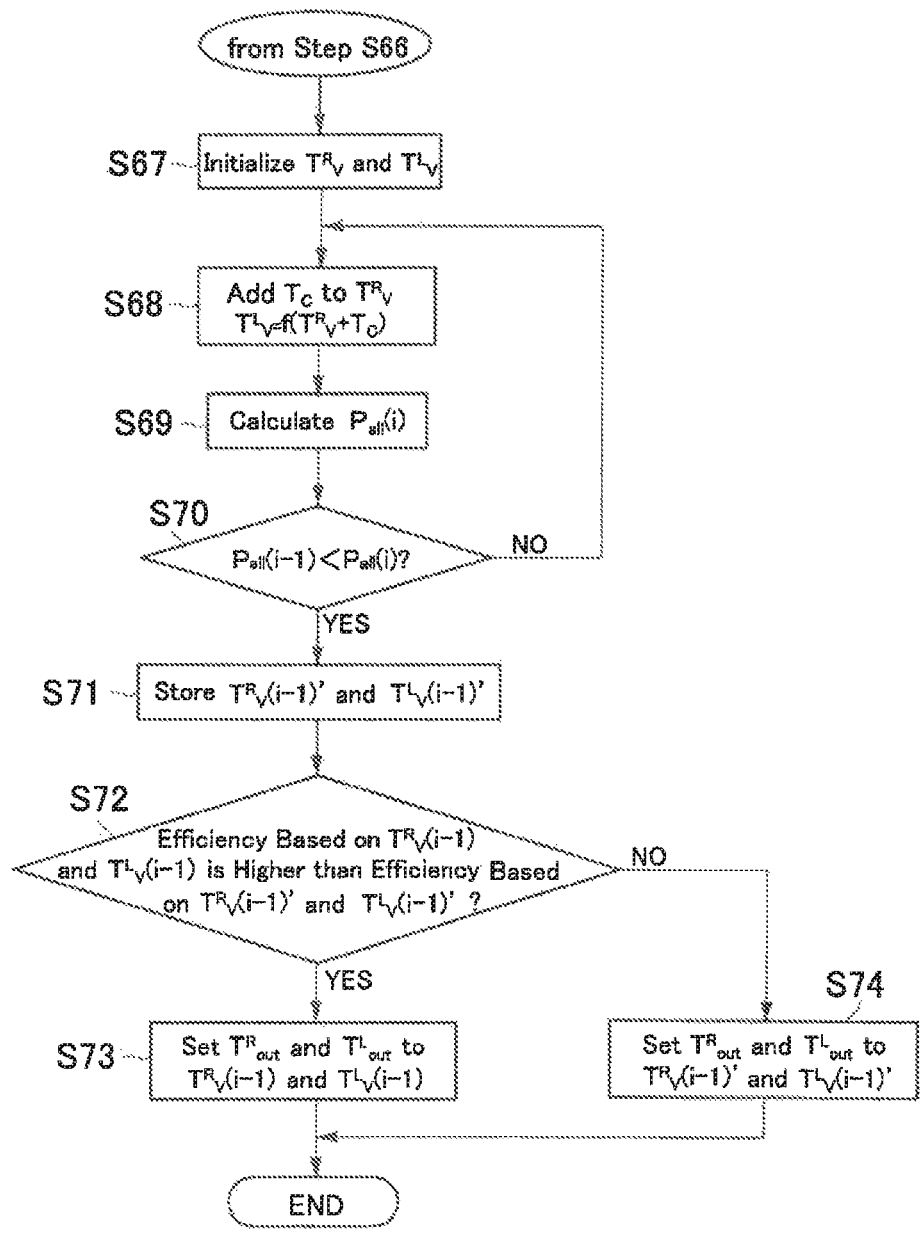
FIG. 18 is a flowchart showing step S67 to step S74 in the control example for the drive force control system according to the embodiment.
Figure 19:
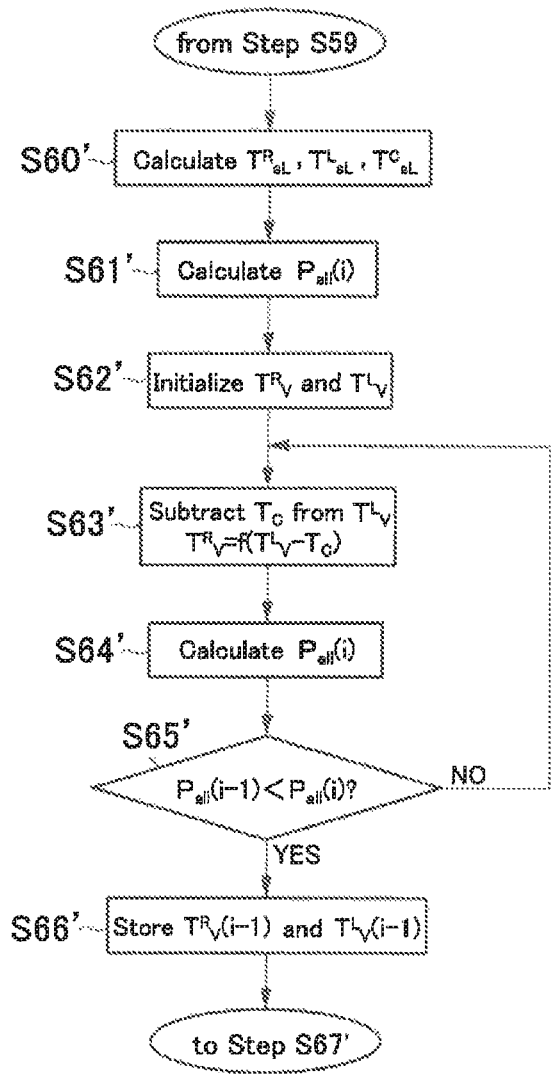
FIG. 19 is a flowchart showing step S60' to step S66' in the control example for the drive force control system according to the embodiment.
Figure 20:
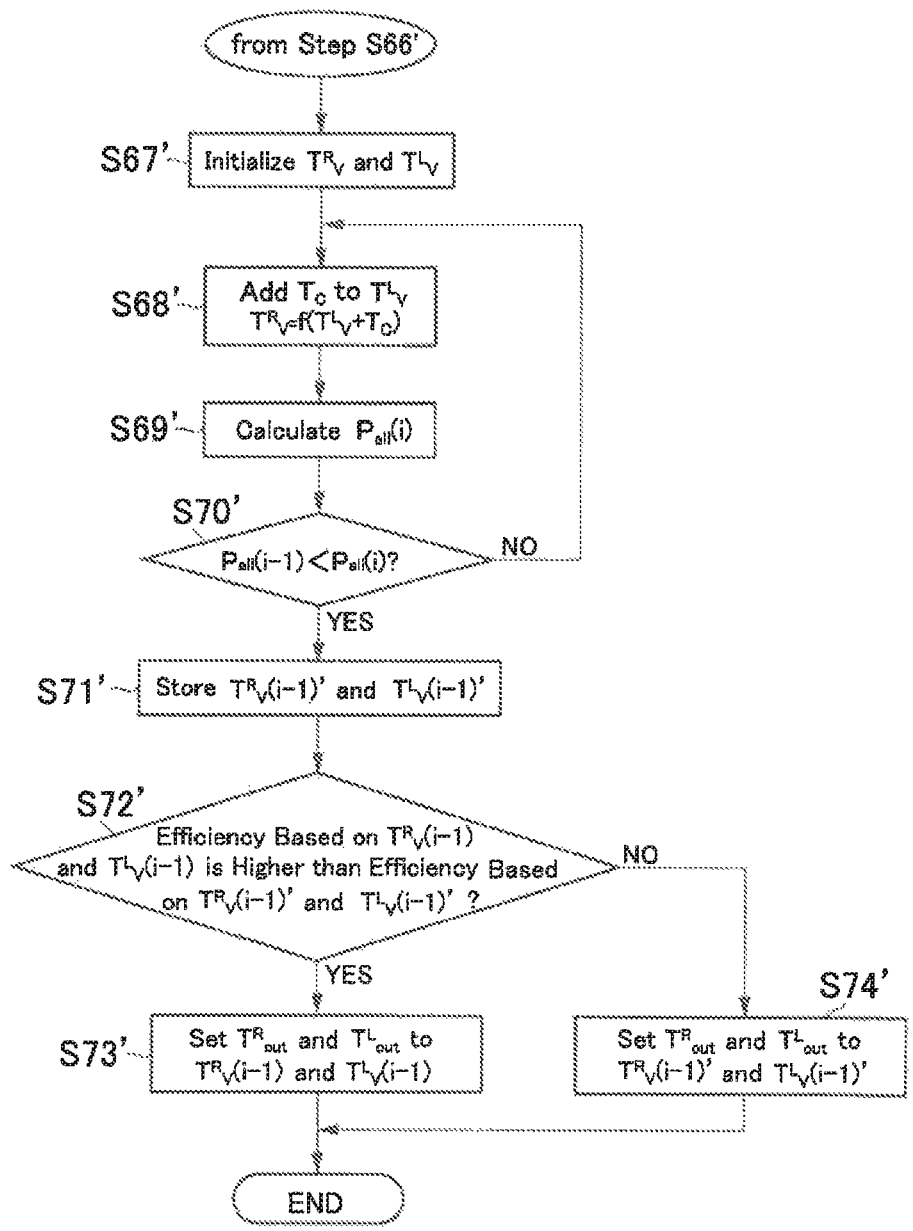
FIG. 20 is a flowchart showing step S67' to step S74' in the control example for the drive force control system according to the embodiment.

FIG. 8 illustrates relationship between the torque of the first motor 2R achieving the required torque $T_{all}$ and an efficiency $\eta_{all}$ of the first drive unit 1 as a whole. According to the relationship, the efficiency $\eta_{all}$ of the first drive unit 1 as a whole increases (that is, the power consumption amount decreases) as the torque of the first motor 2R increases, until the torque reaches a predetermined torque. The efficiency $\eta_{all}$ of the first drive unit 1 as a whole decreases (that is, the power consumption amount increases) as the torque of the first motor 2R increases after the torque has reached the predetermined torque. Thus, at step S15, it is determined whether or not the power consumption amount $P_{all}(i)$ after changing the torque of the motors 2R and 2L is greater than a power consumption amount $P_{all}(i-1)$ immediately before the change. Specifically, it is determined whether or not the torque of the first motor 2R has exceeded the torque of the first motor 2R achieving the maximum efficiency $\eta_{all}$ in FIG. 8, that is, whether or not the motors 2R and 2L have been operating with the minimum power consumption amounts immediately before changing the torques of the motors 2R and 2L. In the following explanation, (i-1) designates a parameter immediately before changing the currently set variables $T^R_v$ and $T^L_v$, that is, a parameter calculated based on variables $T^R_v(i-1)$ and $T^L_v(i-1)$.

When the power consumption amount $P_{all}(i)$ after changing the torques of the motors 2R and 2L is greater than the power consumption amount $P_{all}(i-1)$ immediately before the change so that the answer of step S15 is YES, the routine progresses to step S16 to set target torques $T^R_{out}$ and $T^L_{out}$ of the motors 2R and 2L to the torques $T^R_v(i-1)$ and $T^L_v(i-1)$ immediately before changing the torques of the motors 2R and 2L. Then, this control is temporarily terminated.

By contrast, when the power consumption amount $P_{all}(i)$ after changing the torques of the motors 2R and 2L is equal to or smaller than the power consumption amount $P_{all}(i-1)$ immediately before the change so that the answer of step S15 is NO, the routine returns to step S13. Specifically, the predetermined value $T_c$ is further added to the variable $T^R_v$ for searching for the torque of the first motor 2R that has been changed at step S13 and the predetermined value $T_c$ is further subtracted from the variable $T^L_v$ for searching for the torque of the second motor 2L that has been changed at step S13. Thus, step S13, step S14, and step S15 are repeated until the operating statuses of the motors 2R and 2L with the smallest power consumption amount are found, that is, until the answer of step S15 will be YES.

When the efficiency of the first drive unit 1 as a whole is higher in the case where the second motor 2L is mainly controlled than in the case where the first motor 2R is mainly controlled so that the answer of step S11 is NO, the routine progresses to step S17 to initialize the variables $T^R_v$ and $T^L_v$ for searching for the torques of the motors 2R and 2L achieving the maximum efficiency of the first drive unit 1 as a whole. Specifically, the variable $T^R_v$ for searching for the torque of the first motor 2R is set to the torque $T^R_{maxL}$ set at step S9, and the variable $T^L_v$ for searching for the torque of the second motor 2L is set to the torque $T^L_{maxL}$ set at step S9. The first motor 2R and the second motor 2L in the case where the answer of step S11 will be NO are respectively the "second controlled motor" and the "first controlled motor" in the embodiment.

Thereafter, at step S18, the predetermined value $T_c$ is subtracted from the variable $T^R_v$ for searching for the torque of the first motor 2R currently set and the predetermined value $T_c$ is added to the variable $T^L_v$ for searching for the torque of the second motor 2L currently set. The same predetermined value $T_c$ is used for the addition and the subtraction at step S18. Thus, the torques of the motors 2R and 2L are adjusted without changing the torque generated by the first drive unit 1. The predetermined value $T_c$ to the variable (torque) $T^R_v$ for searching for the torque of the first motor 2R, as a result of subtracting the predetermined value $T_c$, corresponds to the "second provisional torque" in the embodiment. The variable $T^L_v$ for searching for the torque of the second motor 2L, as a result of adding the predetermined value $T_c$, corresponds to the "first provisional torque" in the embodiment.

At step S19, the power consumption amount $P_{all}(i)$ of the power storage device 27 is calculated based on the variables $T^R_v$ and $T^L_v$ that have been replaced at step S18 (currently set variables). The calculation at step S19 can be performed in a manner similar to that at step S10 described above.

Thereafter, at step S20, it is determined whether or not the power consumption amount $P_{all}(i)$ after changing the torque of the motors 2R and 2L is greater than the power consumption amount $P_{all}(i-1)$ immediately before the change. Specifically, it is determined whether or not the torque of the first motor 2R has dropped below the torque of the first motor 2R achieving the maximum efficiency $\eta_{all}$ of the first drive unit 1 as a whole or whether or not the torque of the first motor 2R has exceeded the torque of the second motor 2L achieving the maximum efficiency $\eta_{all}$ of the first drive unit 1 as a whole, that is, whether or not the motors 2R and 2L have been operating with the minimum power consumption amounts immediately before changing the torques of the motors 2R and 2L. This is because the relationship between the torque of the second motor 2L satisfying the required torque $T_{all}$ and the efficiency $\eta_{all}$ of the first drive unit 1 as a whole is expected to be the same as that in the example illustrated in FIG. 8.

When the power consumption amount $P_{all}(i)$ after changing the torques of the motors 2R and 2L is greater than the power consumption amount $P_{all}(i-1)$ immediately before the change so that the answer of step S20 is YES, the routine progresses to step S21 to set the target torques $T^R_{out}$ and $T^L_{out}$ of the motors 2R and 2L to the torques $T^R_v(i-1)$ and $T^L_v(i-1)$ immediately before changing the torques of the motors 2R and 2L. Then, the control is temporarily terminated.

By contrast, when the power consumption amount $P_{all}(i)$ after changing the torques of the motors 2R and 2L is equal to or smaller than the power consumption amount $P_{all}(i-1)$ immediately before the change so that the answer of step S20 is NO, the routine returns to step S18. Specifically, the predetermined value $T_c$ is further subtracted from the variable $T^R_v$ for searching for the torque of the first motor 2R that has been changed at step S18 and the predetermined value $T_c$ is further added to the variable $T^L_v$ for searching for the torque of the second motor 2L that has been changed at step S18. Thus, step S18, step S19, and step S20 are repeated until the operating statuses of the motors 2R and 2L with the smallest power consumption amount are found, that is, until the answer of step S20 will be YES.

As described, based on the operating point achieving high efficiency of one of the first motor 2R and the second motor 2L, the output torque of the other motor may be set, and the torques of the motors 2R and 2L may be changed to calculate the power consumption amount of the first drive unit 1. Thus, the motors 2R and 2L can be controlled to operate with the smallest power consumption amount of the first drive unit 1 while maintaining the required torques of the drive wheels 11R and 11L. Specifically, the operating points of the motors 2R and 2L achieving the maximum efficiency of the first drive unit 1 can be found from step S8 to step S21.

When the required torque $T_{all}$ is equal to or smaller than the total torque $T_{max}$ so that the answer of step S7 is NO, the routine progresses to step S22 to determine whether or not the torque $T^R_{max}$ of the first motor 2R achieving high efficiency of the first motor 2R is larger than the torque $T^L_{max}$ of the second motor 2L achieving high efficiency of the second motor 2L. This step is performed because the first motor 2R and the second motor 2L may have different characteristics. If the motors 2R and 2L have difference characteristics, the torques $T^R_{max}$ and $T^L_{max}$ of the motors 2R and 2L achieving high efficiency are compared with each other. Then, the motor 2R (2L) corresponding to the larger one of the torques is mainly controlled. The speeds of the motors 2R and 2L at the operating points of the motors 2R and 2L at step S22 are speeds corresponding to the speeds of the wheels connected to the motors 2R and 2L (or the vehicle speed). The first motor 2R and the second motor 2L in the case where the answer of step S22 is YES are respectively the "first controlled motor" and the "second controlled motor" in the embodiment. By contrast, the first motor 2R and the second motor 2L in the case where the answer of step S22 is NO are respectively the "second controlled motor" and the "first controlled motor" in the embodiment.

When the torque $T^R_{max}$ of the first motor 2R is greater than the torque $T^L_{max}$ of the second motor 2L so that the answer of step S22 is YES, the routine progresses to step S23 to determine whether or not the required torque $T_{all}$ can be achieved by operating the first motor 2R at the operating point achieving high efficiency, that is, whether or not the torque $T^R_{max}$ of the first motor 2R is greater than the required torque $T_{all}$. Thus, the second motor 2L is determined to operate as a motor or as a generator while the first motor 2R is operated at the operating point achieving higher efficiency.

When the required torque $T_{all}$ cannot be achieved by operating the first motor 2R at the operating point achieving high efficiency so that the answer of step S23 is NO, the second motor 2L is operated as a motor while the first motor 2R is operated at the operating point achieving high efficiency. For this purpose, at step S24, the torques $T^R_{maxR}$ and $T^L_{maxR}$ of the motors 2R and 2L in a case of operating the first motor 2R at the operating point achieving high efficiency are calculated. Specifically, the output torque $T^R_{maxR}$ of the first motor 2R is calculated based on the operating point achieving high efficiency of the first motor 2R and the current speed, and the output torque $T^L_{maxR}$ of the second motor 2L is calculated based on a difference between the required torque $T_{all}$ and the torque $T^R_{maxR}$ of the first motor 2R. The output torque $T^R_{maxR}$ of the first motor 2R and the output torque $T^L_{maxR}$ of the second motor 2L are respectively the "efficient torque of the first motor" and the "efficient torque of the second motor" in the embodiment.

At step S25, the power consumption amount $P_{all}(i)$ of the power storage device 27 of a case in which the first motor 2R is operated at the operating point achieving high efficiency and the second motor 2L generates the torque in an amount corresponding to the shortage, is calculated. The calculation at step S25 can be performed in a manner similar to that at step S10.

Thereafter, the operating points of the motors 2R and 2L achieving the maximum efficiency of the first drive unit 1 as a whole are further searched as at step S12 to step S21.

Specifically, at step S26, the variables $T^R_v$ and $T^L_v$ for searching for the torque of the first motor 2R achieving the maximum efficiency of the first drive unit 1 as a whole are initialized. Specifically, the variable $T^R_v$ for searching for the torque of the first motor 2R is set to be the torque $T^R_{maxR}$ calculated at step S24, and the variable $T^L_v$ for searching for the torque of the second motor 2L is set to be the torque $T^L_{maxR}$ calculated at step S24.

Thereafter, at step S27, the predetermined value $T_c$ is added to the variable $T^R_v$ for searching for the torque of the first motor 2R currently set, and the predetermined value $T_c$ is subtracted from the variable $T^L_v$ for searching for the torque of the second motor 2L currently set. This step S27 is that same as step S18 described above. The variable (torque) $T^R_v$ for searching for the torque of the first motor 2R, as a result of adding the predetermined value $T_c$, corresponds to the "first provisional torque" in the embodiment. The variable $T^L_v$ for searching for the torque of the second motor 2L, as a result of subtracting the predetermined value $T_c$, corresponds to the "second provisional torque" in the embodiment.

Thereafter, at step S28, the power consumption amount $P_{all}(i)$ of the power storage device 27 is calculated based on the variables $T^R_v$ and $T^L_v$ that have been replaced at step S27 (currently set variables). The calculation at step S28 can be performed in a manner similar to that at step S10, step S14, and the like.

Thereafter, it is determined whether or not the power consumption amount $P_{all}(i)$ after changing the torque of the motors 2R and 2L is larger than the power consumption amount $P_{all}(i-1)$ immediately before the change. Specifically, at step S29, it is determined whether or not the power consumption amount $P_{all}(i)$ is greater than the power consumption amount obtained at step S25 or the power consumption amount at the point where the answer of step S29 is determined to be NO, or whether or not the variable $T^R_v$ for searching for the torque of the first motor 2R currently set has reached the maximum torque $T_{outmaxR}$ that can be output from the first motor 2R. This step S29 includes determining whether or not the variable $T^R_v$ for searching for the torque of the first motor 2R currently set has reached the maximum torque $T_{outmaxR}$ that can be output from the first motor 2R, in addition to the determination that is the same as that at step S15 and step S20.

When the power consumption amount $P_{all}(i)$ after changing the torques of the motors 2R and 2L is greater than the power consumption amount $P_{all}(i-1)$ immediately before the change or the variable $T^R_v$ for searching for the torque of the first motor 2R currently set has reached the maximum torque $T_{outmaxR}$ that can be output from the first motor 2R so that the answer of step S29 is YES, the routine progresses to step S30 to temporarily store the torques $T^R_v(i-1)$ and $T^L_v(i-1)$ immediately before changing the motors 2R and 2L in the first ECU 30.

By contrast, when the power consumption amount $P_{all}(i)$ after changing the torques of the motors 2R and 2L is smaller than the power consumption amount $P_{all}(i-1)$ immediately before the change or the variable $T^R_v$ for searching for the torque of the first motor 2R currently set has not reached the maximum torque $T_{outmaxR}$ that can be generated by the first motor 2R so that the answer of step S29 will be NO, the routine returns to step S27. Specifically, the predetermined value $T_c$ is further added to the variable $T^R_v$ for searching for the torque of the first motor 2R that has been changed at step S27 and the predetermined value $T_c$ is further subtracted from the variable $T^L_v$ for searching for the torque of the second motor 2L that has been changed at step S27. Thus, step S27, step S28, and step S29 are repeated until the operating statuses of the motors 2R and 2L with the smallest power consumption amount are found, that is, until the answer of step S29 is determined to be YES By contrast, the required torque $T_{all}$ might be achieved when the first motor 2R generates the maximum torque $T_{outmaxR}$. In such an event, higher efficiency of the first drive unit 1 might be achieved with the first motor 2R generating the torque that is equal to or larger than the required torque $T_{all}$ with the excessive amount of torque used by the second motor 2L operating as a generator. Specifically, higher efficiency of the first drive unit 1 might be achieved with the first motor 2R and the second motor 2l generating torques in the opposite directions, even when the required torques of the drive wheels 11R and 11L are in the same direction. Thus, at step S31, it is determined whether or not the required torque $T_{all}$ can be achieved with the first motor 2R operating as a motor and the second motor 2L operating as a generator. Specifically, it is determined whether or not the maximum torque $T_{outmaxR}$ of the first motor 2R is greater than the required torque $T_{all}$.

When the required torque $T_{all}$ cannot be achieved by the first motor 2R operated as a motor and the second motor 2L operated as a generator so that the answer of step S31 is NO, the routine progresses to step S32 to set target torques $T^R_{out}$ and $T^L_{out}$ of the motors 2R and 2L to the torques $T^R_v(i-1)$ and $T^L_v(i-1)$ of the motors 2R and 2L stored in the first ECU 30 at step S30. Then, this control is temporarily terminated.

Be contrast, when the required torque $T_{all}$ can be achieved with the first motor 2R operated as a motor and the second motor 2L operated as a generator so that the answer of step S31 is YES, the routine progresses to step S33 to calculate the torques $T^R_{outmaxR}$ and $T^L_{outmaxR}$ of the motors 2R and 2L in the event where the first motor 2R generates the maximum torque $T_{outmaxR}$. Specifically, the output torque $T^R_{outmaxR}$ of the first motor 2R is obtained based on the characteristics of the first motor 2R, and the output torque $T^L_{outmaxR}$ of the second motor 2L is obtained based on a difference between the required torque $T_{all}$ and the torque $T^R_{outmaxR}$ of the first motor 2R. In this case, the second motor 2L generates an output torque of a "negative" value, that is, a regenerative torque. The maximum torque $T^R_{outmaxR}$ of the first motor 2R and the maximum torque $T^L_{outmaxR}$ of the second motor 2L respectively correspond to the "first reference torque" and the "second reference torque" in the embodiment.

At step S34, the power consumption amount $P_{all}(i)$ of the power storage device 27 in the event where the first motor 2R generates the maximum torque $T_{outmaxR}$ and the second motor 2L operates as a generator is calculated. This step S34 may the same as that at step S10.

Thereafter, the operating points of the motors 2R and 2L achieving the maximum efficiency of the first drive unit 1 as a whole are further searched for, as at step S12 or S21 described above.

Specifically, at step S35, the variables $T^R_v$ and $T^L_v$ for searching for the torque of the first motor 2R achieving the maximum efficiency of the first drive unit 1 as a whole are initialized. Specifically, the variable $T^R_v$ for searching for the torque of the first motor 2R is set to be the torque $T^R_{outmaxR}$ obtained at step S33, and the variable $T^L_v$ for searching for the torque of the second motor 2L is set to be the torque $T^L_{outmaxR}$ obtained at step S33.

Thereafter, at step S36, the predetermined value $T_c$ is subtracted from the variable $T^R_v$ for searching for the torque of the first motor 2R currently set, and the predetermined value $T_c$ is added to the variable $T^L_v$ for searching for the torque of the second motor 2L currently set. Specifically, at step S36, the generated torque of the first motor 2R is reduced and the regeneration amount of the second motor 2L is reduced. This step S36 is the same as step S18 and step S27 described above. The variable (torque) $T^R_v$ for searching for the torque of the first motor 2R, as a result of subtracting the predetermined value $T_c$, corresponds to a "first provisional torque" in the embodiment. The variable $T^L_v$ for searching for the torque of the second motor 2L, as a result of adding the predetermined value $T_c$, corresponds to a "second provisional torque" in the embodiment.

Thereafter, at step S37, the power consumption amount $P_{all}(i)$ of the power storage device 27 is calculated based on the variables $T^R_v$ and $T^L_v$ that have been replaced at step S36 (currently set variables). This step S37 can be the same as step S14, step S19, and the like.

Thereafter, at step S38, it is determined whether or not the power consumption amount $P_{all}(i)$ after changing the torque of the motors 2R and 2L is greater than the power consumption amount $P_{all}(i-1)$ immediately before the change. This step S38 is the same as step S15 and step S20. When the power consumption amount $P_{all}(i)$ after changing the torques of the motors 2R and 2L is greater than the power consumption amount $P_{all}(i-1)$ immediately before the change so that the answer of step S38 is YES, the routine returns to step S36. At step S36, the predetermined value $T_c$ is further subtracted from the variable $T^R_v$ for searching for the torque of the first motor 2R that has been changed at step S36 and the predetermined value $T_c$ is further added to the variable $T^L_v$ for searching for the torque of the second motor 2L that has been changed at step S36 so that the regeneration amount is reduced. Thus, step S36, step S37, and step S38 are repeated until the operating statuses of the motors 2R and 2L with the smallest power consumption amount are found, that is, until the answer of step S38 will be YES.

By contrast, when the power consumption amount $P_{all}(i)$ after changing the torques of the motors 2R and 2L is smaller than the power consumption amount $P_{all}(i-1)$ immediately before the change so that the answer of step S37 is NO, the routine progresses to step S39 to temporarily store the torques $T^R_v(i-1)'$ and $T^L_v(i-1)'$ of the motors 2R and 2L immediately before the change in the first ECU 30.

Thereafter, at step S40, it is determined whether or not the efficiency of the first drive unit 1 is higher in the case where the motors 2R and 2L are operated based on the torques $T^R_v(i-1)$ and $T^L_v(i-1)$ stored in the first ECU 30 at step S30, than in the case where the motors 2R and 2L are operated based on the torques $T^R_v(i-1)'$ and $T^L_v(i-1)'$ stored in the first ECU 30 at step S39. Specifically, it is determined whether or not the power consumption amount $P_{all}(i-1)$ obtained at step S28 immediately before the answer of step S29 is determined to be YES is smaller than the power consumption amount $P_{all}(i-1)$ obtained at step S37 immediately before the answer of step S38 is determined to be YES.

When the efficiency of the first drive unit 1 is higher in the case where the motors 2R and 2L are operated based on the torques $T^R_v(i-1)$ and $T^L_v(i-1)$ stored in the first ECU 30 at step S30 than in the case where the motors 2R and 2L are operated based on the torques $T^R_v(i-1)'$ and $T^L_v(i-1)'$ stored in the first ECU 30 at step S39, so that the answer of step S40 is YES, the routine progresses to step S32 to respectively set the torques $T^R_{out}$ and $T^L_{out}$ of the motors 2R and 2L to be the torques $T^R_v(i-1)$ and $T^L_v(i-1)$ of the motors 2R and 2L stored in the first ECU 30 at step S30. Then, this routine is temporarily terminated.

By contrast, when the efficiency of the first drive unit 1 is higher in the case where the motors 2R and 2L are operated based on the torques $T^R_v(i-1)'$ and $T^L_v(i-1)'$ stored in the first ECU 30 at step S39 than in the case where the motors 2R and 2L are operated based on the torques $T^R_v(i-1)$ and $T^L_v(i-1)$ stored in the first ECU 30 at step S30, so that the answer of step S40 is NO, the routine progresses to step S41 to set the target torques $T^R_{out}$ and $T^L_{out}$ of the motors 2R and 2L to the torques $T^R_v(i-1)'$ and $T^L_v(i-1)'$ of the motors 2R and 2L stored in the first ECU 30 at step S39. Then, this routine is temporarily terminated.

When the required torque $T_{all}$ can be achieved with the first motor 2R operating at the operating point achieving high efficiency so that the answer of step S23 is YES, the first motor 2R can be operated as a motor and the second motor 2L can be operated as a generator. Thus, the operating point of the motors 2R and 2L achieving the maximum efficiency of the first drive unit 1 in such an event is searched for. It is unknown as to whether or not the torque of the first motor 2R is larger than the torque $T^R_{max}$ of the first motor 2R achieving high efficiency at the operating point. Therefore, first of all, an operating point with a small power consumption amount is searched for by reducing the torque of the first motor 2R. Then, an operating point with a small power consumption amount is searched for by increasing the torque of the first motor 2R.

At step S42, the operating point with a small power consumption amount is searched for by reducing the torque of the first motor 2R. Specifically, the torques $T^R_{maxR}$ and $T^L_{maxR}$ of the motors 2R and 2L in the event of operating the first motor 2R at the operating point with high efficiency are obtained. At this step S42, the output torque $T^R_{maxR}$ of the first motor 2R is obtained based on the operating point with high efficiency of the first motor 2R and the current speed, and the output torque $T^L_{maxR}$ of the second motor 2L is obtained based on the difference between the required torque $T_{all}$ and the torque $T^R_{maxR}$ of the first motor 2R as at step S24 and the like described above. In this case, the second motor 2L generates an output torque of a "negative" value, that is, a regenerative torque.

At step S43, the power consumption amount $P_{all}(i)$ of the power storage device 27 in the event where the motors 2R and 2L generate the torques obtained at step S42 is calculated. This step S43 can be the same as step S10, step S14, and the like.

Thereafter, at step S44, the variables $T^R_v$ and $T^L_v$ for searching for the torque of the motors 2R and 2L achieving the maximum efficiency of the first drive unit 1 as a whole are initialized. Specifically, the variable $T^R_v$ for searching for the torque of the first motor 2R is set to be the torque $T^R_{maxR}$ obtained at step S42 and the variable $T^L_v$ for searching for the torque of the second motor 2L is set to be the torque $T^L_{maxR}$ obtained at step S42.

Thereafter, at step S45, the predetermined value $T_c$ is subtracted from the variable $T^R_v$ for searching for the torque of the first motor 2R currently set, and the predetermined value $T_e$ is added to the variable $T^L_v$ for searching for the torque of the second motor 2L currently set. Specifically, at step S36, the output torque of the first motor 2R is reduced and the regeneration amount of the second motor 2L is reduced. This step S45 is the same as step S36 described above. The variable (torque) $T^R_v$ for searching for the torque of the first motor 2R, as a result of subtracting the predetermined value $T_c$, corresponds to the "first provisional torque" in the embodiment. The variable $T^L_v$ for searching for the torque of the second motor 2L, as a result of adding the predetermined value $T_c$, corresponds to the "second provisional torque" in the embodiment.

Thereafter, at step S46, the power consumption amount $P_{all}(i)$ of the power storage device 27 is calculated based on the variables $T^R_v$ and $T^L_v$ that have been replaced at step S45 (currently set variables). This step S46 can be the same as step S10, step S14, and the like.

Thereafter, at step S47, it is determined whether or not the power consumption amount $P_{all}(i)$ after changing the torque of the motors 2R and 2L is greater than the power consumption amount $P_{all}(i-1)$ immediately before the change. This step S47 is the same as step S15, step S20, and the like.

Thereafter, at step S48, when the power consumption amount $P_{all}(i)$ after changing the torque of the motors 2R and 2L is larger than a power consumption amount $P_{all}(i-1)$ immediately before the change so that the answer of step S47 is YES, the target torques of the motors 2R and 2L are temporarily stored in the first ECU 30 as the torques $T^R_v(i-1)$ and $T^L_v(i-1)$ immediately before changing the torques of the motors 2R and 2L.

By contrast, when the power consumption amount $P_{all}(i)$ after changing the torque of the motors 2R and 2L is smaller than the power consumption amount $P_{all}(i-1)$ immediately before the change so that the answer of step S47 is NO, the routine returns to step S45. Specifically, the predetermined value $T_c$ is further subtracted from the variable $T^R_v$ for searching for the torque of the first motor 2R that has been changed at step S45 and the predetermined value $T_c$ is further added to the variable $T^L_v$ for searching for the torque of the second motor 2L that has been changed at step S45. Thus, step S45, step S46, and step S47 are repeated until the operating statuses of the motors 2R and 2L with the smallest power consumption amount are found, that is, until the answer of step S47 will be YES.

Thereafter, at step S49, the operating point with a small power consumption amount is searched for by increasing the torques of the first motor 2R. Specifically, first of all, the variables $T^R_v$ and $T^L_v$ for searching for the torques of the motors 2R and 2L achieving the maximum efficiency of the first drive unit 1 as a whole is initialized. At this step S49, the variable $T^R_v$ for searching for the torque of the first motor 2R is set to be the torque $T^R_{maxR}$ obtained at step S42, and the variable $T^L_v$ for searching for the torque of the second motor 2L is set to be the torque $T^L_{maxR}$ obtained at step S42. Thus, step S49 is the same as step S44 described above.

Thereafter, at step S50, the predetermined value $T_c$ is added to the variable $T^R_v$ for searching for the torque of the first motor 2R currently set and the predetermined value $T_c$ is subtracted from the variable $T^L_v$ for searching for the torque of the second motor 2L currently set. Thus, at step S50, the output torque of the first motor 2R and the regeneration amount of the second motor 2L are increased. The variable (torque) $T^R_v$ for searching for the torque of the first motor 2R, as a result of adding the predetermined value $T_c$, and the variable $T^L_v$ for searching for the torque of the second motor 2L, as a result of subtracting the predetermined value $T_c$, respectively correspond to the "first provisional torque" and the "second provisional torque" in the embodiment.

At step S51, a power consumption amount $P_{all}(i)$ of the power storage device 27 is calculated based on the variables $T^R_v$ and $T^L_v$ that have been replaced at step S50 (currently set variables). This step S51 can be the same as step S10, step S14, and the like.

Thereafter, at step S52, it is determined whether or not the power consumption amount $P_{all}(i)$ after changing the torque of the motors 2R and 21, is greater than the power consumption amount $P_{all}(i-1)$ immediately before the change. This step S52 is the same as step S15, step S20, and the like.

When the power consumption amount $P_{all}(i)$ after changing the torques of the motors 2R and 2L is larger than the power consumption amount $P_{all}(i-1)$ immediately before the change so that the answer of step S52 is YES, the routine progresses to step S53, and the target torques of the motors 2R and 2L are temporarily stored in the first ECU 30 as the torques $T^R_v(i-1)'$ and $T^L_v(i-1)'$ immediately before changing the torques of the motors 2R and 2L.

By contrast, when the power consumption amount $P_{all}(i)$ after changing the torques of the motors 2R and 2L is equal to or smaller than the power consumption amount $P_{all}(i-1)$ immediately before the change so that the answer of step S52 is NO, the routine returns to step S50. Specifically, the predetermined value $T_c$ is further added to the variable $T^R_v$ for searching for the torque of the first motor 2R that has been changed at step S50, and the predetermined value $T_c$ is further subtracted from the variable $T^L_v$ for searching for the torque of the second motor 2L that has been changed at step S50. Thus, step S50, step S51, and step S52 are repeated until the operating statuses of the motors 2R and 2L with the smallest power consumption amount are found, that is, until the answer of step S52 will be YES.

Thereafter, at step S54, it is determined whether or not the efficiency of the first drive unit 1 is higher in the case where the motors 2R and 2L are operated based on the torques $T^R_v(i-1)$ and $T^L_v(i-1)$ stored in the first ECU 30 at step S48, than in the case where the motors 2R and 2L are operated based on the torques $T^R_v(i-1)'$ and $T^L_v(i-1)'$ stored in the first ECU 30 at step S53. Specifically, it is determined whether or not the power consumption amount $P_{all}(i-1)$ obtained at step S46 immediately before the answer of step S47 is determined to be YES is smaller than the power consumption amount $P_{all}(i-1)$ obtained at step S51 immediately before the answer of step S52 is determined to be YES.

When the efficiency of the first drive unit 1 is higher in the case where the motors 2R and 2L are operated based on the torques $T^R_v(i-1)$ and $T^L_v(i-1)$ stored in the first ECU 30 at step S48, than in the case where the motors 2R and 2L are operated based on the torques $T^R_v(i-1)'$ and $T^L_v(i-1)'$ stored in the first ECU 30 at step S53 so that the answer of step S54 is YES, the routine progresses to step S55 to set the target torques $T^R_{out}$ and $T^L_{out}$ of the motors 2R and 2L to be the torques $T^R_v(i-1)$ and $T^L_v(i-1)$ of the motors 2R and 2L stored in the first ECU 30 at step S48. Then, this routine is temporarily terminated.

By contrast, when the efficiency of the first drive unit 1 is higher in the case where the motors 2R and 2L are operated based on the torques $T^R_v(i-1)'$ and $T^L_v(i-1)'$ stored in the first ECU 30 at step S53 than in the case where the motors 2R and 2L are operated based on the torques $T^R_v(i-1)$ and $T^L_v(i-1)$ stored in the first ECU 30 at step S48, so that the answer of step S54 is NO, the routine progresses to step S56 to set the target torques $T^R_{out}$ and $T^L_{out}$ of the motors 2R and 2L to the torques $T^R_v(i-1)'$ and $T^L_v(i-1)'$ of the motors 2R and 2L stored in the first ECU 30 at step S53. Then, this routine is temporarily terminated.

As described, in the state where the clutch 22 is completely engaged so that the same torque is transmitted to the right front wheel 11R and the left front wheel 11L, the first drive unit 1 can be prevented from generating an excessive amount of torque by searching for the target torques $T^R_{out}$ and $T^L_{out}$ of the first motor 2R and the second motor 2L achieving the smallest power consumption amount of the power storage device 27 under a condition of satisfying the required torque $T_{all}$. Thus, in the 4WD vehicle illustrated in FIG. 2, the target torques $T^R_{out}$ and $T^L_{out}$ the motors 2R and 2L are set with the required torque of the front wheel serving as the reference. Thus, the front wheel and the rear wheel can be prevented from outputting torques in the opposite directions, so that the slipping amount of any of the drive wheels can be prevented from increasing. As a result, the drive wheels 11R, 11L, 39R, and 39L can be prevented from wearing and the power loss between the drive wheels and the road surface can be prevented from increasing. All things considered, the efficiency of the vehicle Ve as a whole can be improved.

By contrast, when the torque $T^R_{max}$ of the first motor 2R achieving high efficiency is smaller than the torque $T^L$max of the second motor 2L achieving high efficiency so that the answer of step S22 is NO, the operating point achieving high efficiencies of the motors 2R and 2L are searched for as at step S23 to step S56. How the operating points are searched for can be understood by replacing the "first motor 2R" with the "second motor 2L" and replacing the "second motor 2L"

with the "first motor 2R" from step S23 to step S56, and thus will not be elaborated upon here. Steps in the figure with provided numbers with an apostrophe.

When the torque ratio $T_{rF}$ between the right front wheel 11R and the left front wheel 11L obtained at step S2 is not within a predetermined range of values, so that the answer of step S3 will be NO, the clutch 22 is disengaged (including causing a slip). When a slip is caused in the clutch 22, power loss based on the torque transmitting capacity of the clutch 22 and the slipping amount in the clutch 22 occurs, and the clutch 22 emits heat due to the power loss. Thus, at step S57, it is determined whether or not the clutch 22 needs to be completely disengaged to prevent the clutch 22 from wearing. Specifically, it is determined whether or not the torque ratio $T_{rF}$ obtained at step S2, requires the clutch 22 to be completely disengaged, based on the durability of the clutch 22 or the like. Specifically, it is determined whether or not the torque ratio obtained at step S2 is equal to or higher than a predetermined first threshold a or is equal to or lower than a predetermined second threshold ß. The thresholds are upper and lower limits of the torque ratio $T_{rF}$ that is high when the torque transmitted to the right front wheel 11R is larger than the torque transmitted to the left front wheel 11L, and is low when the torque transmitted to the right front wheel 11R is smaller than the torque transmitted to the left front wheel 11L, for example.

When the torque ratio $T_{rF}$ obtained at step S2 requires the clutch 22 to be completely disengaged so that the answer of step S57 is YES, the routine progresses to step S58 to completely disengage the clutch 22 and set the target torques $T^R_{out}$ and $T^L_{out}$ of the motors 2R and 2L, to be the required torques of the drive wheels 11R and 11L connected to the motors 2R and 2L. Then, this routine is temporarily terminated.

By contrast, when the torque ratio $T_{rF}$ obtained at step S2 only requires a slip to be caused in the clutch 22 so that the answer of step S57 is NO, the routine progresses to step S59 to determine whether or not the first motor 2R is connected to the drive wheel requiring a large torque. For example, when the vehicle Ve is turning left, the torque required for the right front wheel 11R serving as the outer wheel is greater than the torque required for the left front wheel 11L. In this case, since the first motor 2R is connected to the right front wheel 11R, the answer of step S59 will be YES. In this case, the first motor 2R and the second motor 2L respectively correspond to a "third controlled motor" and a "fourth controlled motor" in the embodiment. When the answer of step S59 is NO, the first motor 2R and the second motor 2L respectively correspond to the "fourth controlled motor" and the "third controlled motor" in the embodiment.

If the first motor 2R is connected to the drive wheel requiring a large torque so that the answer at step S59 will be YES, the routine progresses to step S60 to obtain the output torques $T^R_{sR}$ and $T^L_{sR}$ of the first motor 2R and the second motor 2L and the torque transmitting capacity $T^C_{sR}$ of the clutch 22, based on an operating point achieving high efficiency of the first motor 2R.

At step S60, first of all, the torque $T^R$sR of the first motor 2R is obtained based on the current speed of the first motor 2R and a map based on the characteristics of the first motor 2R. The torque $T^R_{sR}$ of the first motor 2R corresponds to the "third reference torque" in the embodiment. Thereafter, the torque transmitting capacity $T^C_{sR}$ of the clutch 22 is obtained based on a difference between the torque $T^R_{sR}$ of the first motor 2R thus obtained and the required torque of the right front wheel 11R. Thereafter, the power loss involved in the torque transmission by the clutch 22 is obtained. The power loss can be obtained from the engagement pressure and the slipping amount in the clutch 22. This engagement pressure may be the engagement pressure for setting the torque transmitting capacity $T^C_{sR}$ and the slip amount in the clutch 22 may be a difference between the right and the left wheels 11R and 11L in the speed. Thereafter, the torque $T^L_{sR}$ of the second motor 2L is obtained based on a difference between the required torque of the left front wheel 11L and the torque transmitted from the first motor 2R via the clutch 22. The torque $T^L_{sR}$ of the second motor 2L corresponds to the "fourth reference torque" in the embodiment.

A specific example of step S60 is described. In this example, the required torque of the right front wheel 11R is 100 Nm, the required torque of the left front wheel 11L is 20 Nm, and the torque $T^R_{sR}$ achieving high efficiency of the first motor 2R is 120 Nm. First of all, the torque $T^R_{sR}$ of the first motor 2R is set to 120 Nm, and the torque transmitting capacity $T^C_{sR}$ of the clutch 22 is set to 20 Nm (120 Nm−100 Nm). When the power loss of the clutch 22 is 10 Nm, the left front wheel 11L receives 10 Nm from the first motor 2R via the clutch 22. Thus, the output torque $T_{sR}$ of the second motor 2L is set to 10 Nm (20 Nm−10 Nm) that is a difference between the required torque of the left front wheel 11L and the torque transmitted from the first motor 2R to the left front wheel 11L via the clutch 22.

Thereafter, at step S61, the power consumption amount $P_{all}(i)$ of the power storage device 27 in the case where the motors 2R and 2L and the clutch 22 are controlled to achieve high efficiency of the first motor 2R is obtained. The power consumption amount $P_{all}(i)$ obtained at step S61 is a power consumption amount of the power storage device 27 obtained by calculating the power consumption amounts of the motors 2R and 2L and adding the power consumption amount for setting the torque transmitting capacity $T^C_{sR}$ of the clutch 22 to the power consumption amounts, as in the case of the power consumption amount obtained at step S10. The power consumption amount required for setting the torque transmitting capacity $T^C_{sR}$ of the clutch 22 can be obtained based on electromagnetic force required to be generated and the like.

Thereafter, at step S62, the variables $T^R_v$ and $T^L_v$ for searching for the torques of the motors 2R and 2L achieving the maximum efficiency of the first drive unit 1 as a whole are initialized. Specifically, the variable $T^R_v$ for searching for the torque of the first motor 2R is set to be the torque $T^R_{sR}$ obtained at step S60, and the variable $T^L_v$ for searching for the torque of the second motor 2L is set to be the torque $T^L_{sR}$ obtained at step S60.

Thereafter, at step S63, the predetermined value $T_c$ is subtracted from the variable $T^R_v$ for searching for the torque of the first motor 2R currently set. Then, the variable $T^L_v$ for searching for the torque of the second motor 2L is changed based on the variable $T^R_v$ for searching for the torque of the first motor 2R from which the predetermined value $T_c$ has been subtracted. Specifically, the torque transmitting capacity $T^C_{sR}$ of the clutch 22 is obtained based on the value obtained by subtracting the predetermined value $T_c$ from the variable $T^R_v$ for searching for the torque of the first motor 2R. Then, the variable $T^L_v$ for searching for the torque of the second motor 2L is set based on the torque transmitting capacity $T^C_{sR}$ of the clutch 22. Specifically, the torque $T^L_{sR}$ of the second motor 2L is searched for by changing the value of the torque $T^R_{sR}$ of the first motor 2R for obtaining the torques $T^R_{sR}$ and $T^L_{sR}$ of the motors 2R and 2L and the torque transmitting capacity $T^C_{sR}$ of the clutch 22 at step S60. When the variable $T^R_v$ for searching for the torque of the first motor 2R decreases, the torque transmitted from the first motor 2R to the left front wheel 11L decreases so that the variable $T^L_v$ for searching for the torque of the second motor 2L increases. The torque of the first motor 2R, as a result of subtracting the predetermined value $T_c$, corresponds to the "third provisional torque" in the embodiment, and the torque of the second motor 2L, as a result of adding the predetermined value $T_c$, corresponds to the "fourth provisional torque" in the embodiment.

Thereafter, at step S64, the power consumption amount $P_{all}(i)$ of the power storage device 27 is calculated based on the variables $T^R_v$ and $T^L_v$ that have been replaced at step S63 (currently set variables). This step S63 can be the same as step S61. Specifically, the power consumption amount $P_{all}(i)$ of the power storage device 27 can be obtained by obtaining the power consumption amount based on the torques $T^R_v$ and $T^L_v$ of the motors 2R and 2L that have been changed at step S63, and adding the power consumption amount based on the torque transmitting capacity $T^C_{sR}$ of the clutch 22 for obtaining the second motor 2L at step S63 to the power consumption amount thus obtained.

Thereafter, at step S65, it is determined whether or not the power consumption amount $P_{all}(i)$ after changing the torque of the motors 2R and 2L is greater than the power consumption amount $P_{all}(i-1)$ immediately before the change. This step S65 is the same as step S15, step S20, and the like.

When the power consumption amount $P_{all}(i)$ after changing the torques of the motors 2R and 2L is greater than the power consumption amount $P_{all}(i-1)$ immediately before the change so that the answer of step S65 will be YES, the routine progresses to step S66 to temporarily store the torques $T^R_v(i-1)$ and $T^L_v(i-1)$ immediately before changing the torques of the motors 2R and 2L in the first ECU 30.

By contrast, when the power consumption amount $P_{all}(i)$ after changing the torques of the motors 2R and 2L is smaller than the power consumption amount $P_{all}(i-1)$ immediately before the change so that the answer of step S65 is NO, the routine returns to step S63. Specifically, the predetermined value $T_c$ is further subtracted from the variable $T^R_v$ for searching for the torque of the first motor 2R that has been changed at step S63, and the variable $T^L_v$ for searching for the torque of the second motor 2L is changed based on the resultant variable $T^R_v$. Thus, step S63, step S64, and step S65 are repeated until the operating statuses of the motors 2R and 2L with the smallest power consumption amount are found, that is, until the answer of step S65 will be YES.

At step S62 to step S65, the operating point of the motors 2R and 2L for efficiently operating the first drive unit 1 is searched for, by reducing the torque of the first motor 2R. Still, the first drive unit 1 may be efficiently driven by increasing the torque of the first motor 2R. Thus, after step S65, the operating point of the motors 2R and 2L for efficiently operating the first drive unit 1 is searched for by increasing the torque of the first motor 2R.

Specifically, at step S67, the variables $T^R_v$ and $T^L_v$ for searching for the torques of the motors 2R and 2L for achieving the maximum efficiency of the drive unit 1 as a whole are initialized. Specifically, at step S67, the variable $T^R_v$ for searching for the torque of the first motor 2R is set to be the torque $T^R_{sR}$ obtained at step S60, and the variable $T^L_v$ for searching for the torque of the second motor 2L is set to be the torque $T^L_{sR}$ obtained at step S60. Thus, step S67 is the same as step S62.

Thereafter, at step S68, the predetermined value $T_c$ is added to the variable $T^R_v$ for searching for the torque of the first motor 2R currently set, and the variable $T^L_v$ for searching for the torque of the second motor 2L is changed based on the result of adding the predetermined value $T_c$ to the variable $T^R_v$ for searching for the torque of the first motor 2R. This step S68 can be the same as step S63. When the variable $T^R_v$ for searching for the torque of the first motor 2R increases, the torque transmitted from the first motor 2R to the left front wheel 11L increases, so that the variable $T^L_v$ for searching for the torque of the second motor 2L decreases. The torque of the first motor 2R, as a result of adding the predetermined value $T_c$, corresponds to the "third provisional torque" in the embodiment, and the torque of the second motor 2L, as a result of subtracting the predetermined value $T_c$, corresponds to the "fourth provisional torque" in the embodiment of the present invention.

At step S69, the power consumption amount $P_{all}(i)$ of the power storage device 27 is calculated based on the variables $T^R_v$ and $T^L_v$ that have been replaced at step S68 (currently set variables). This step S69 may the same as step S64.

Thereafter, at step S70, it is determined whether or not the power consumption amount $P_{all}(i)$ after changing the torque of the motors 2R and 2L is greater than the power consumption amount $P_{all}(i-1)$ immediately before the change. Specifically, it is determined whether or not the motors 2R and 2L have been operated with the smallest power consumption amounts, immediately before changing the torques of the motors 2R and 2L.

When the power consumption amount $P_{all}(i)$ after changing the torques of the motors 2R and 2L is larger than the power consumption amount $P_{all}(i-1)$ immediately before the change so that the answer of step S70 is YES, the routine progresses to step S71 to temporarily store the torques $T^R_v(i-1)'$ and $T^L_v(i-1)'$, immediately before changing the torques of the motors 2R and 2L, in the first ECU 30.

By contrast, when the power consumption amount $P_{all}(i)$ after changing the torques of the motors 2R and 2L is smaller than the power consumption amount $P_{all}(i-1)$ immediately before the change so that the answer of step S70 is NO, the routine returns to step S68. Specifically, the predetermined value $T_c$ is further added to the variable $T^R_v$ for searching for the torque of the first motor 2R that has been changed at step S67, and the variable $T^L_v$ for searching for the torque of the second motor 2L is changed accordingly. Thus, step S68, step S69, and step S70 are repeated until the operating statuses of the motors 2R and 2L with the smallest power consumption amount are found, that is, until the answer of step S69 will be YES.

Thereafter, at step S72, it is determined whether or not the first drive unit 1 is operated with higher efficiency in the case of using the torques $T^R_v(i-1)$ and $T^L_v(i-1)$ of the motors 2R and 2L stored in the first ECU 30 at step S66 for the operation than in the case of using the torques $T^R_v(i-1)'$ and $T^L_v(i-1)'$ of the motors 2R and 2L stored in the first ECU 30 at step S71 for the operation. Specifically, it is determined whether or not the power consumption amount $P_{all}(i-1)$ obtained at step S64 immediately before the answer of step S65 is determined to be YES is smaller than the power consumption amount $P_{all}(i-1)$ obtained at step S69 immediately before the answer of step S70 is determined to be YES.

When the efficiency of the first drive unit 1 is higher in the case of using the torques $T^R_v(i-1)$ and $T^L_v(i-1)$ of the motors 2R and 2L stored in the first ECU 30 at step S66 for the operation than in the case of using the torques $T^R_v(i-1)'$ and $T^L_v(i-1)'$ of the motors 2R and 2L stored in the first ECU 30 at step S71 for the operation so that the answer of step S72 is YES, the routine progresses to step S73 to set the target torques $T^R_{out}$ and $T^L_{out}$ of the motors 2R and 2L to be the torques $T^R_v(i-1)$ and $T^L_v(i-1)$ of the motors 2R and 2L stored in the first ECU 30 at step S66. Then, this routine is temporarily terminated.

By contrast, when the efficiency of the first drive unit 1 is higher in the case of using the torques $T^R_v(i-1)'$ and $T^L_v(i-1)'$ of the motors 2R and 2L stored in the first ECU 30 at step S71 for the operation than in the case of using the torques $T^R_v(i-1)$ and $T^L_v(i-1)$ of the motors 2R and 2L stored in the first ECU 30 at step S66 for the operation so that the answer at step S72 is NO, the routine progresses to step S74 to set the target torques $T^R_{out}$ and $T^L_{out}$ of the motors 2R and 2L to be the torques $T^R_v(i-1)'$ and $T^L_v(i-1)'$ of the motors 2R and 2L stored in the first ECU 30 at step S71. Then, this routine is temporarily terminated.

As described, when a slip is caused in the clutch 22, the torque of one motor 2R (2L), the torque transmitting capacity of the clutch 22 is set, and then the target torque of the other motor 2L (2R) is obtained. Then, the power consumption amounts of the motors 2R and 2L and the clutch 22 are calculated. As a result, the motors 2R and 2L can generate torques for efficiently operating the first drive unit 1 as a whole. The target torques $T^H_{out}$ and $T^L_{out}$ of the first motor 2R and the second motor 2L involving the smallest power consumption amount of the power storage device 27 under the condition of achieving the required torque $T_{all}$, as in the case where the clutch 22 is engaged. Thus, the first drive unit 1 can be prevented from outputting an excessive amount of torque. Thus, in the 4WD vehicle illustrated in FIG. 2, the target torques $T^R_{out}$ and $T^L_{out}$ of the motors 2R and 2L are set with the required torque of the front wheel serving as the reference. Thus, the front wheel and the rear wheel can be prevented from generating torques in the opposite directions, so that the slipping amount of any of the drive wheels can be prevented from increasing. As a result, the drive wheels 11R, 11L, 39R, and 39L can be prevented from wearing and the power loss between the drive wheels and the road surface can be prevented from increasing. All things considered, the vehicle Ve as a whole can be operated more efficiently.

The operating points for operating the motors 2R and 2L efficiently are searched for as at step S60 to step S74, also when the second motor 2L is connected to the drive wheel requiring a larger torque so that the answer of step S59 will be NO. How the operating points are searched for can be understood by replacing the "first motor 2R" with the "second motor 2L" and replacing the "second motor 2L" with the "first motor 2R" at step S60 to step S74, and will not be elaborated upon here. Steps in the relevant figure is provided with a number with an apostrophe.

The target torques $T^R_{out}$ and $T^L_{out}$ of the motors 2R and 2L as described above do not necessarily need to be obtained based on the detection values such as a wheel speed actually detected and the characteristics (map) of the motors 2R and 2L as in the control example. Specifically, a plurality of combinations of torques of the first motor 2R and the second motor 2L may be set under a condition that the sum torque transmitted to the left drive wheel 11L and the right drive wheel 11R satisfies the torques required for the left drive wheel 11L and the right drive wheel 11R, based on design values (characteristics) of the motors 2R and 2L. Then, the efficiency of the first drive unit 1 may be constantly calculated for each of the combinations of torques thus set, and the target torques $T^R_{out}$ and $T^L_{cut}$ of the motors 2R and 2L may be set by obtaining the torques that can achieve the maximum efficiency of the first drive unit 1. Further, the target torques $T^R_{out}$ and $T^L_{out}$ of the motors 2R and 2L achieving the maximum efficiency of the first drive unit 1 may be obtained in advance through calculations and experiments using the required torques and the required torque of the drive wheels 11R and 11L as parameters, and written to a map. Then, the target torques $T^R_{out}$ and $T^L_{out}$ of the motors 2R and 2L may be set based on the map.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A drive force control system, comprising:
a first motor connected to a right drive wheel;
a second motor connected to a left drive wheel;
an electrical power source that supplies electric power to the first motor and the second motor;
a clutch that allows a torque transmission between the first motor and the second motor, in which a torque transmitting capacity is variable; and
a controller that controls output torques from the first motor and the second motor, wherein the controller is configured to:
control the output torques of the first motor and the second motor to equalize a sum of torques transmitted to the right drive wheel and the left drive wheel to propel a vehicle while setting the torque transmitting capacity of the clutch greater than a predetermined value, to a total value of required torques of the right drive wheel and the left drive wheel,
calculate a target output torque of the first motor and a target output torque of the second motor to minimize an output power from the electrical power source, and
generate a torque by the first motor based on the calculated target output torque of the first motor, and generate a torque by the second motor based on the calculated target torque of the second motor,
calculate a first reference torque of a first controlled motor from among the first motor and the second motor to maximize an efficiency of the first controlled motor when the first controlled motor is rotated at a speed based on a wheel speed of a first drive wheel as one of the right drive wheel and the left drive wheel connected to the first controlled motor,
calculate a second reference torque of a second controlled motor as the other one of the first motor and the second motor based on a difference between the first reference torque and the total value,
calculate the target output torque of the first controlled motor based on the first reference torque,
calculate the target output torque of the second controlled motor based on the second reference torque,
calculate a plurality of first provisional torques by changing the first reference torque by a predetermined torque, and calculate a plurality of second provisional torques of the second controlled motor so that the sum is equalized to the total value,
calculate a power consumption amount of the electrical power source to generate the first provisional torque by the first controlled motor and to generate the second provisional torque by the second controlled motor, each time the first reference torque is changed by the predetermined torque, set a target output torque of the first controlled motor to the first provisional torque that has been calculated previously, when the power consumption amount of the electrical power source currently calculated is greater than the power consumption amount of the electrical power source previously calculated, and set a target output torque of the second controlled motor to the second provisional torque that has been calculated previously, when the power consumption amount of the electrical power source currently calculated is greater than the power consumption amount of the electrical power source previously calculated.

2. The drive force control system as claimed in claim 1, wherein the controller is further configured to:
   calculate an efficient torque of the first motor achieving a maximum efficiency of the first motor when the first motor is rotated at a speed based on the wheel speed of the right drive wheel,
   calculate an efficient torque of the second motor achieving a maximum efficiency of the second motor when the second motor is rotated at the speed based on the wheel speed of the left drive wheel, and
   designate one of the first motor and the second motor in which the efficient torque is greater as the first controlled motor.

3. The drive force control system as claimed in claim 1, wherein the controller is further configured to:
   calculate a first power consumption amount of the electrical power source to generate a torque by the first motor to maximize the efficiency of the first motor, and to generate a torque by the second motor so that the sum torque is equalized to the required torque,
   calculate a second power consumption amount of the electrical power source to generate a torque by the second motor to maximize the efficiency of the second motor, and to generate a torque by the first motor so that the sum torque is equalized to the required torque,
   designate the first motor as the first controlled motor when the first power consumption amount is smaller than the second power consumption amount, and
   designate the second motor as the first controlled motor when the first power consumption amount is larger than the second power consumption amount.

4. The drive force control system as claimed in claim 1, wherein the controller is further configured to designate one of the first motor and the second motor connected to one of the drive wheels to which a larger torque is required as a third controlled motor.

5. The drive force control system as claimed in claim 1, wherein the controller is further configured to set the target torque of the first motor and the target torque of the second motor so that that the first motor and the second motor generate torques in opposite directions, when the torques are transmitted to the left drive wheel and the right drive wheel in the same direction.

6. A drive force control system, comprising:
   a first motor connected to a right drive wheel;
   a second motor connected to a left drive wheel;
   an electrical power source that supplies electric power to the first motor and the second motor;
   a clutch that allows a torque transmission between the first motor and the second motor, in which a torque transmitting capacity is variable; and
   a controller that controls output torques from the first motor and the second motor wherein the controller is configured to:
   control the output torques of the first motor and the second motor to equalize a sum of torques transmitted to the right drive wheel and the left drive wheel to propel a vehicle while setting the torque transmitting capacity of the clutch greater than a predetermined value, to a total value of required torques of the right drive wheel and the left drive wheel,
   calculate a target output torque of the first motor and a target output torque of the second motor to minimize an output power from the electrical power source, and
   generate a torque by the first motor based on the calculated target output torque of the first motor, and generate a torque by the second motor based on the calculated target torque of the second motor,
   calculate a third reference torque as a maximum torque of a third controlled motor that is one of the first motor and the second motor,
   calculate a fourth reference torque of a fourth controlled motor that is the other one of the first motor and the second motor based on a difference between the third reference torque and the required torque,
   calculate a target torque of the third controlled motor based on the third reference torque, and
   calculate a target torque of the fourth controlled motor based on the fourth reference torque,
   control the torque transmitting capacity of the clutch,
   calculate the torque transmitting capacity of the clutch based on a difference between a torque transmitted to a second drive wheel as one of the left drive wheel and the right drive wheel connected to the third controlled motor and the required torque of the second drive wheel, when the third controlled motor generates the third reference torque, and
   calculate the fourth reference torque based on a torque transmitted to a third drive wheel as the other one of the right drive wheel and the left drive wheel via the clutch and the required torque of the third drive wheel, when the third controlled motor generates the third reference torque.

7. The drive force control system as claimed in claim 6, wherein the controller is further configured to:
   calculate a plurality of third provisional torques by changing the third reference torque by a predetermined torque, and calculate a plurality of fourth provisional torques of the fourth controlled motor so that the sum is equalized to the total value,
   calculate a power consumption amount of the electrical power source to generate the third provisional torque by the third controlled motor and to generate the fourth provisional torque by a the fourth controlled motor, each time the third reference torque is changed by the predetermined torque,
   set a target torque of the third controlled motor to the third provisional torque previously calculated, when the power consumption amount of the electrical power source currently calculated is greater than the power consumption amount of the electrical power source previously calculated, and
   set a target torque of the fourth controlled motor to the fourth provisional torque previously calculated, when the power consumption amount of the electrical power source currently calculated is greater than the power consumption amount of electrical power source previously calculated.

8. The drive force control system as claimed in claim 6, wherein the controller is further configured to designate one of the first motor and the second motor connected to one of the drive wheels to which a larger torque is required as the third controlled motor.

9. The drive force control system as claimed in claim 6, wherein the controller is further configured to set the target torque of the first motor and the target torque of the second motor so that that the first motor and the second motor generate torques in opposite directions, when the torques are transmitted to the left drive wheel and the right drive wheel in the same direction.

10. A drive force control system, comprising:
a first motor connected to a right drive wheel;
a second motor connected to a left drive wheel;
an electrical power source that supplies electric power to the first motor and the second motor;
a clutch that allows a torque transmission between the first motor and the second motor, in which a torque transmitting capacity is variable; and
a controller that controls output torques from the first motor and the second motor wherein the controller is configured to:
control the output torques of the first motor and the second motor to equalize a sum of torques transmitted to the right drive wheel and the left drive wheel to propel a vehicle while setting the torque transmitting capacity of the clutch greater than a predetermined value, to a total value of required torques of the right drive wheel and the left drive wheel,
calculate a target output torque of the first motor and a target output torque of the second motor to minimize an output power from the electrical power source, and
generate a torque by the first motor based on the calculated target output torque of the first motor, and generate a torque by the second motor based on the calculated target torque of the second motor,
calculate a third reference torque as a maximum torque of a third controlled motor that is one of the first motor and the second motor,
calculate a fourth reference torque of a fourth controlled motor that is the other one of the first motor and the second motor based on a difference between the third reference torque and the required torque,
calculate a target torque of the third controlled motor based on the third reference torque, and
calculate a target torque of the fourth controlled motor based on the fourth reference torque,
calculate a plurality of third provisional torques by changing the third reference torque by a predetermined torque, and calculate a plurality of fourth provisional torques of the fourth controlled motor so that the sum is equalized to the total value,
calculate a power consumption amount of the electrical power source to generate the third provisional torque by the third controlled motor and to generate the fourth provisional torque by a the fourth controlled motor, each time the third reference torque is changed by the predetermined torque,
set a target torque of the third controlled motor to the third provisional torque previously calculated, when the power consumption amount of the electrical power source currently calculated is greater than the power consumption amount of the electrical power source previously calculated, and
set a target torque of the fourth controlled motor to the fourth provisional torque previously calculated, when the power consumption amount of the electrical power source currently calculated is greater than the power consumption amount of the electrical power source previously calculated,
control the torque transmitting capacity of the clutch,
calculate the torque transmitting capacity of the clutch based on a difference between a torque transmitted to a fourth drive wheel as one of the left drive wheel and the right drive wheel connected to the third controlled motor and the required torque of the fourth drive wheel, when the third controlled motor generates the third provisional torque, and
calculate the fourth provisional torque based on a torque transmitted to a fifth drive wheel as the other one of the right drive wheel and the left drive wheel via the clutch and the required torque of the fifth drive wheel, when the third controlled motor generates the third provisional torque.

11. The drive force control system as claimed in claim 10, wherein the controller is further configured to designate one of the first motor and the second motor connected to one of the drive wheels to which a larger torque is required as the third controlled motor.

12. The drive force control system as claimed in claim 10, wherein the controller is further configured to set the target torque of the first motor and the target torque of the second motor so that that the first motor and the second motor generate torques in opposite directions, when the torques are transmitted to the left drive wheel and the right drive wheel in the same direction.

* * * * *

UNITED STATES PATENT AND TRADEMARK OFFICE
CERTIFICATE OF CORRECTION

PATENT NO. : 10,654,483 B2
APPLICATION NO. : 15/901123
DATED : May 19, 2020
INVENTOR(S) : Takanobu Nasu et al.

Page 1 of 1

It is certified that error appears in the above-identified patent and that said Letters Patent is hereby corrected as shown below:

In the Claims

In Claim 7, on Line 24, the word "the" is added between "consumption amount of" and "electrical power source."

Signed and Sealed this
Twenty-second Day of September, 2020

Andrei Iancu
*Director of the United States Patent and Trademark Office*